(12) United States Patent
Melanson

(10) Patent No.: US 8,288,954 B2
(45) Date of Patent: Oct. 16, 2012

(54) PRIMARY-SIDE BASED CONTROL OF SECONDARY-SIDE CURRENT FOR A TRANSFORMER

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 549 days.

(21) Appl. No.: 12/415,830

(22) Filed: Mar. 31, 2009

(65) Prior Publication Data

US 2010/0244726 A1    Sep. 30, 2010

Related U.S. Application Data

(60) Provisional application No. 61/120,455, filed on Dec. 7, 2008.

(51) Int. Cl.
| | |
|---|---|
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/14 | (2006.01) |
| H05B 39/02 | (2006.01) |
| H05B 41/16 | (2006.01) |
| H05B 41/24 | (2006.01) |

(52) U.S. Cl. ............... 315/219; 315/206; 315/209 R; 315/254; 315/297

(58) Field of Classification Search .............. None
See application file for complete search history.

(56) References Cited

U.S. PATENT DOCUMENTS

| | | | |
|---|---|---|---|
| 3,316,495 A | 4/1967 | Sherer | |
| 3,423,689 A | 1/1969 | Miller et al. | |
| 3,586,988 A | 6/1971 | Weekes | |

(Continued)

FOREIGN PATENT DOCUMENTS

EP    0585789 A1    3/1994

(Continued)

OTHER PUBLICATIONS

D. Hausman, Lutron, RTISS-TE Operation, Real-Time Illumination Stability Systems for Trailing-Edge (Reverse Phase Control) Dimmers, v. 1.0 Dec. 2004.

(Continued)

*Primary Examiner* — Douglas W Owens
*Assistant Examiner* — Dedei K Hammond
(74) *Attorney, Agent, or Firm* — Hamilton & Terrile, LLP; Kent B. Chambers

(57) ABSTRACT

A power control system includes a transformer and a controller regulates a current on a secondary-side of the transformer based on a primary-side signal value. In at least one embodiment, the secondary-side current is a current out of a filter coupled to a rectifier and the secondary-side of the transformer and into a load. In at least one embodiment, the primary-side signal value is a sample of a current in the primary-side windings of the transformer. In at least one embodiment, the primary-side signal value represents a sample value of a primary-side transformer current. Proper timing of sampling the primary-side signal value substantially eliminates contributions of a transformer magnetizing current from the primary-side transformer current sample. Sampling the primary-side signal value when contributions of the transformer magnetizing current are substantially eliminated allows at least an average of the secondary-side current to be determined from the primary-side signal value.

41 Claims, 10 Drawing Sheets

U.S. PATENT DOCUMENTS

| | | | |
|---|---|---|---|
| 3,725,804 A | 4/1973 | Langan | |
| 3,790,878 A | 2/1974 | Brokaw | |
| 3,881,167 A | 4/1975 | Pelton et al. | |
| 4,075,701 A | 2/1978 | Hofmann | |
| 4,334,250 A | 6/1982 | Theus | |
| 4,409,476 A | 10/1983 | Lofgren et al. | |
| 4,414,493 A | 11/1983 | Henrich | |
| 4,476,706 A | 10/1984 | Hadden et al. | |
| 4,523,128 A | 6/1985 | Stamm | |
| 4,677,366 A | 6/1987 | Wilkinson et al. | |
| 4,683,529 A | 7/1987 | Bucher | |
| 4,700,188 A | 10/1987 | James | |
| 4,737,658 A | 4/1988 | Kronmuller et al. | |
| 4,797,633 A | 1/1989 | Humphrey | |
| 4,937,728 A | 6/1990 | Leonardi | |
| 4,940,929 A | 7/1990 | Williams | |
| 4,973,919 A | 11/1990 | Allfather | |
| 4,979,087 A | 12/1990 | Sellwood et al. | |
| 4,980,898 A | 12/1990 | Silvian | |
| 4,992,919 A | 2/1991 | Lee et al. | |
| 4,994,952 A | 2/1991 | Silva et al. | |
| 5,001,620 A | 3/1991 | Smith | |
| 5,055,746 A | 10/1991 | Hu et al. | |
| 5,109,185 A | 4/1992 | Ball | |
| 5,121,079 A | 6/1992 | Dargatz | |
| 5,206,540 A | 4/1993 | de Sa e Silva et al. | |
| 5,264,780 A | 11/1993 | Bruer et al. | |
| 5,278,490 A | 1/1994 | Smedley | |
| 5,323,157 A | 6/1994 | Ledzius et al. | |
| 5,359,180 A | 10/1994 | Park et al. | |
| 5,383,109 A | 1/1995 | Maksimovic et al. | |
| 5,424,932 A | 6/1995 | Inou et al. | |
| 5,477,481 A | 12/1995 | Kerth | |
| 5,479,333 A | 12/1995 | McCambridge et al. | |
| 5,481,178 A | 1/1996 | Wilcox et al. | |
| 5,565,761 A | 10/1996 | Hwang | |
| 5,589,759 A | 12/1996 | Borgato et al. | |
| 5,638,265 A | 6/1997 | Gabor | |
| 5,691,890 A | 11/1997 | Hyde | |
| 5,747,977 A | 5/1998 | Hwang | |
| 5,757,635 A | 5/1998 | Seong | |
| 5,764,039 A | 6/1998 | Choi et al. | |
| 5,768,111 A | 6/1998 | Zaitsu | |
| 5,781,040 A | 7/1998 | Myers | |
| 5,783,909 A | 7/1998 | Hochstein | |
| 5,798,635 A | 8/1998 | Hwang et al. | |
| 5,900,683 A | 5/1999 | Rinehart et al. | |
| 5,912,812 A | 6/1999 | Moriarty, Jr. | |
| 5,929,400 A | 7/1999 | Colby et al. | |
| 5,946,202 A | 8/1999 | Balogh | |
| 5,946,206 A | 8/1999 | Shimizu et al. | |
| 5,952,849 A | 9/1999 | Haigh et al. | |
| 5,960,207 A | 9/1999 | Brown | |
| 5,962,989 A | 10/1999 | Baker | |
| 5,963,086 A | 10/1999 | Hall | |
| 5,966,297 A | 10/1999 | Minegishi | |
| 5,994,885 A | 11/1999 | Wilcox et al. | |
| 6,016,038 A | 1/2000 | Mueller et al. | |
| 6,043,633 A | 3/2000 | Lev et al. | |
| 6,072,969 A | 6/2000 | Yokomori et al. | |
| 6,083,276 A | 7/2000 | Davidson et al. | |
| 6,084,450 A | 7/2000 | Smith et al. | |
| 6,091,233 A | 7/2000 | Hwang | |
| 6,125,046 A | 9/2000 | Jang et al. | |
| 6,150,774 A | 11/2000 | Mueller et al. | |
| 6,181,114 B1 | 1/2001 | Hemena et al. | |
| 6,211,626 B1 | 4/2001 | Lys et al. | |
| 6,211,627 B1 | 4/2001 | Callahan | |
| 6,229,271 B1 | 5/2001 | Liu | |
| 6,229,292 B1 | 5/2001 | Redl et al. | |
| 6,246,183 B1 | 6/2001 | Buonavita | |
| 6,259,614 B1 | 7/2001 | Ribarich et al. | |
| 6,300,723 B1 | 10/2001 | Wang et al. | |
| 6,304,066 B1 | 10/2001 | Wilcox et al. | |
| 6,304,473 B1 | 10/2001 | Telefus et al. | |
| 6,343,026 B1 | 1/2002 | Perry | |
| 6,344,811 B1 | 2/2002 | Melanson | |
| 6,369,525 B1 | 4/2002 | Chang et al. | |
| 6,385,063 B1 | 5/2002 | Sadek et al. | |
| 6,407,514 B1 | 6/2002 | Glaser et al. | |
| 6,407,515 B1 | 6/2002 | Hesler | |
| 6,407,691 B1 | 6/2002 | Yu | |
| 6,441,558 B1 | 8/2002 | Muthu et al. | |
| 6,445,600 B2 | 9/2002 | Ben-Yaakov | |
| 6,452,521 B1 | 9/2002 | Wang | |
| 6,469,484 B2 | 10/2002 | L'Hermite et al. | |
| 6,495,964 B1 | 12/2002 | Muthu et al. | |
| 6,509,913 B2 | 1/2003 | Martin, Jr. et al. | |
| 6,531,854 B2 | 3/2003 | Hwang | |
| 6,580,258 B2 | 6/2003 | Wilcox et al. | |
| 6,583,550 B2 | 6/2003 | Iwasa et al. | |
| 6,628,106 B1 | 9/2003 | Batarseh et al. | |
| 6,636,003 B2 | 10/2003 | Rahm et al. | |
| 6,646,848 B2 | 11/2003 | Yoshida et al. | |
| 6,657,417 B1 | 12/2003 | Hwang | |
| 6,688,753 B2 | 2/2004 | Calon et al. | |
| 6,713,974 B2 | 3/2004 | Patchornik et al. | |
| 6,724,174 B1 | 4/2004 | Esteves et al. | |
| 6,727,832 B1 | 4/2004 | Melanson | |
| 6,737,845 B2 | 5/2004 | Hwang | |
| 6,741,123 B1 | 5/2004 | Anderson et al. | |
| 6,753,661 B2 | 6/2004 | Muthu et al. | |
| 6,756,772 B2 | 6/2004 | McGinnis | |
| 6,768,655 B1 | 7/2004 | Yang et al. | |
| 6,781,351 B2 | 8/2004 | Mednik et al. | |
| 6,788,011 B2 | 9/2004 | Mueller et al. | |
| 6,806,659 B1 | 10/2004 | Mueller et al. | |
| 6,839,247 B1 | 1/2005 | Yang | |
| 6,860,628 B2 | 3/2005 | Robertson et al. | |
| 6,870,325 B2 | 3/2005 | Bushell et al. | |
| 6,873,065 B2 | 3/2005 | Haigh et al. | |
| 6,882,552 B2 | 4/2005 | Telefus et al. | |
| 6,888,322 B2 | 5/2005 | Dowling et al. | |
| 6,894,471 B2 | 5/2005 | Corva et al. | |
| 6,933,706 B2 | 8/2005 | Shih | |
| 6,940,733 B2 | 9/2005 | Schie et al. | |
| 6,944,034 B1 | 9/2005 | Shteynberg et al. | |
| 6,956,750 B1 | 10/2005 | Eason et al. | |
| 6,958,920 B2 | 10/2005 | Mednik et al. | |
| 6,963,496 B2 | 11/2005 | Bimbaud | |
| 6,967,448 B2 | 11/2005 | Morgan et al. | |
| 6,970,503 B1 | 11/2005 | Kalb | |
| 6,975,079 B2 | 12/2005 | Lys et al. | |
| 6,975,523 B2 | 12/2005 | Kim et al. | |
| 6,980,446 B2 | 12/2005 | Simada et al. | |
| 7,003,023 B2 | 2/2006 | Krone et al. | |
| 7,034,611 B2 | 4/2006 | Oswal et al. | |
| 7,050,509 B2 | 5/2006 | Krone et al. | |
| 7,064,498 B2 | 6/2006 | Dowling et al. | |
| 7,064,531 B1 | 6/2006 | Zinn | |
| 7,072,191 B2 | 7/2006 | Nakao et al. | |
| 7,075,329 B2 | 7/2006 | Chen et al. | |
| 7,078,963 B1 | 7/2006 | Andersen et al. | |
| 7,088,059 B2 | 8/2006 | McKinney et al. | |
| 7,099,163 B1 | 8/2006 | Ying | |
| 7,102,902 B1 | 9/2006 | Brown et al. | |
| 7,106,603 B1 | 9/2006 | Lin et al. | |
| 7,109,791 B1 | 9/2006 | Epperson et al. | |
| 7,126,288 B2 | 10/2006 | Ribarich et al. | |
| 7,135,824 B2 | 11/2006 | Lys et al. | |
| 7,145,295 B1 | 12/2006 | Lee et al. | |
| 7,158,633 B1 | 1/2007 | Hein | |
| 7,161,816 B2 | 1/2007 | Shteynberg et al. | |
| 7,180,250 B1 | 2/2007 | Gannon | |
| 7,183,957 B1 | 2/2007 | Melanson | |
| 7,221,130 B2 | 5/2007 | Ribeiro et al. | |
| 7,233,135 B2 | 6/2007 | Noma et al. | |
| 7,246,919 B2 | 7/2007 | Porchia et al. | |
| 7,255,457 B2 | 8/2007 | Ducharm et al. | |
| 7,266,001 B1 | 9/2007 | Notohamiprodjo et al. | |
| 7,276,861 B1 | 10/2007 | Shteynberg et al. | |
| 7,288,902 B1 | 10/2007 | Melanson | |
| 7,292,013 B1 | 11/2007 | Chen et al. | |
| 7,310,244 B2 | 12/2007 | Yang et al. | |
| 7,345,458 B2 | 3/2008 | Kanai et al. | |
| 7,375,476 B2 | 5/2008 | Walter et al. | |
| 7,388,764 B2 | 6/2008 | Huynh et al. | |

| | | |
|---|---|---|
| 7,394,210 B2 | 7/2008 | Ashdown |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |
| 7,583,136 B2 | 9/2009 | Pelly |
| 7,656,103 B2 | 2/2010 | Shteynberg et al. |
| 7,667,986 B2 | 2/2010 | Artusi et al. |
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2004/0263092 A1* | 12/2004 | Liu .................... 315/247 |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0218838 A1 | 10/2005 | Lys |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0117656 A1 | 5/2008 | Clarkin |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0147544 A1 | 6/2009 | Melanson |
| 2009/0174479 A1 | 7/2009 | Yan et al. |
| 2009/0218960 A1 | 9/2009 | Lyons et al. |
| 2010/0141317 A1 | 6/2010 | Szajnowski |
| 2010/0213857 A1* | 8/2010 | Fan .................... 315/186 |

FOREIGN PATENT DOCUMENTS

| | | |
|---|---|---|
| EP | 0636889 | 2/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1528785 A | 5/2005 |
| EP | 636889 B1 * | 5/2006 |
| EP | 2204905 A1 | 7/2010 |
| GB | 2069269 A | 8/1981 |
| WO | WO9725836 | 7/1997 |
| WO | 01/15316 A1 | 1/2001 |
| WO | 01/97384 A | 12/2001 |
| WO | 02/15386 A2 | 2/2002 |
| WO | WO0227944 | 4/2002 |
| WO | 02/091805 A2 | 11/2002 |
| WO | WO2006013557 | 2/2006 |
| WO | WO 2006/022107 A2 | 3/2006 |
| WO | 2006/067521 A | 6/2006 |
| WO | WO2006135584 | 12/2006 |
| WO | 2007/026170 A | 3/2007 |
| WO | 2007/079362 A | 7/2007 |
| WO | WO 2008/072160 | 6/2008 |
| WO | WO2008072160 | 6/2008 |
| WO | WO2008152838 | 12/2008 |
| WO | WO 2010065598 | 6/2010 |

OTHER PUBLICATIONS

International Rectifier, Data Sheet No. PD60230 revC, IR1150(S)(PbF), uPFC One Cycle Control PFC IC Feb. 5, 2007.

Texas Instruments, Application Report SLUA308, UCC3817 Current Sense Transformer Evaluation, Feb. 2004.

Texas Instruments, Application Report SPRA902A, Average Current Mode Controlled Power Factor Correctiom Converter using TMS320LF2407A, Jul. 2005.

Unitrode, Design Note DN-39E, Optimizing Performance in UC3854 Power Factor Correction Applications, Nov. 1994.

Fairchild Semiconductor, Application Note 42030, Theory and Application of the ML4821 Average Currrent Mode PFC Controller, Aug. 1997.

Fairchild Semiconductor, Application Note AN4121, Design of Power Factor Correction Circuit Using FAN7527B, Rev.1.0.1, May 30, 2002.

Fairchild Semiconductor, Application Note 6004, 500W Power-Factor-Corrected (PFC) Converter Design with FAN4810, Rev. 1.0.1, Oct. 31, 2003.

Fairchild Semiconductor, FAN4822, ZVA Average Current PFC Controller, Rev. 1.0.1 Aug. 10, 2001.

Fairchild Semiconductor, ML4821, Power Factor Controller, Rev. 1.0.2, Jun. 19, 2001.

Fairchild Semiconductor, ML4812, Power Factor Controller, Rev. 1.0.4, May 31, 2001.

Linear Technology, 100 Watt LED Driver, Linear Technology, 2006.

Fairchild Semiconductor, FAN7544, Simple Ballast Controller, Rev. 1.0.0, 2004.

Fairchild Semiconductor, FAN7532, Ballast Controller, Rev. 1.0.2, Jun. 2006.

Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Freescale Semiconductor, Inc., Dimmable Light Ballast with Power Factor Correction, Design Reference Manual, DRM067, Rev. 1, Dec. 2005.
J. Zhou et al., Novel Sampling Algorithm for DSP Controlled 2 kW PFC Converter, IEEE Transactions on Power Electronics, vol. 16, No. 2, Mar. 2001.
A. Prodic, Compensator Design and Stability Assessment for Fast Voltage Loops of Power Factor Correction Rectifiers, IEEE Transactions on Power Electronics, vol. 22, No. 5, Sep. 2007.
M. Brkovic et al., "Automatic Current Shaper with Fast Output Regulation and Soft-Switching," S.15.C Power Converters, Telecommunications Energy Conference, 1993.
Dallas Semiconductor, Maxim, "Charge-Pump and Step-Up DC-DC Converter Solutions for Powering White LEDs in Series or Parallel Connections," Apr. 23, 2002.
Freescale Semiconductor, AN3052, Implementing PFC Average Current Mode Control Using the MC9S12E128, Nov. 2005.
D. Maksimovic et al., "Switching Converters with Wide DC Conversion Range," Institute of Electrical and Electronic Engineer's (IEEE) Transactions on Power Electronics, Jan. 1991.
V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.
S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K. Leung et al., "Dynamic Hysteresis Band Control of the Buck Converter with Fast Transient Response," IEEE Transactions on Circuits and Systems—II: Express Briefs, vol. 52, No. 7, Jul. 2005.
Y. Ohno, Spectral Design Considerations for White LED Color Rendering, Final Manuscript, Optical Engineering, vol. 44, 111302 (2005).
S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.
J. Turchi, Four Key Steps to Design a Continuous Conduction Mode PFC Stage Using the NCP1653, ON Semiconductor, Publication Order No. AND184/D, Nov. 2004.
Megaman, D or S Dimming ESL, Product News, Mar. 15, 2007.
J. Qian et al., New Charge Pump Power-Factor-Correction Electronic Ballast with a Wide Range of Line Input Voltage, IEEE Transactions on Power Electronics, vol. 14, No. 1, Jan. 1999.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
J. Qian et al., Charge Pump Power-Factor-Correction Technologies Part II: Ballast Applications, IEEE Transactions on Power Electronics, vol. 15, No. 1, Jan. 2000.
Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.
M. Madigan et al., Integrated High-Quality Rectifier-Regulators, IEEE Transactions on Industrial Electronics, vol. 46, No. 4, Aug. 1999.
T. Wu et al., Single-Stage Electronic Ballast with Dimming Feature and Unity Power Factor, IEEE Transactions on Power Electronics, vol. 13, No. 3, May 1998.
F. Tao et al., "Single-Stage Power-Factor-Correction Electronic Ballast with a Wide Continuous Dimming Control for Fluorescent Lamps," IEEE Power Electronics Specialists Conference, vol. 2, 2001.
Azoteq, IQS17 Family, IQ Switch®—ProxSense™ Series, Touch Sensor, Load Control and User Interface, IQS17 Datasheet V2.00.doc, Jan. 2007.
C. Dilouie, Introducing the LED Driver, EC&M, Sep. 2004.
S. Lee et al., TRIAC Dimmable Ballast with Power Equalization, IEEE Transactions on Power Electronics, vol. 20, No. 6, Nov. 2005.
L. Gonthier et al., EN55015 Compliant 500W Dimmer with Low-Losses Symmetrical Switches, 2005 European Conference on Power Electronics and Applications, Sep. 2005.
Why Different Dimming Ranges? The Difference Between Measured and Perceived Light, 2000 http://www.lutron.com/ballast/pdf/LutronBallastpg3.pdf.
D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Color Temperature, www.sizes.com/units/color_temperature.htm, printed Mar. 27, 2007.
S. Lee et al., A Novel Electrode Power Profiler for Dimmable Ballasts Using DC Link Voltage and Switching Frequency Controls, IEEE Transactions on Power Electronics, vol. 19, No. 3, May 2004.
Y. Ji et al., Compatibility Testing of Fluorescent Lamp and Ballast Systems, IEEE Transactions on Industry Applications, vol. 35, No. 6, Nov./Dec. 1999.
National Lighting Product Information Program, Specifier Reports, "Dimming Electronic Ballasts," vol. 7, No. 3, Oct. 1999.
Supertex Inc., Buck-based LED Drivers Using the HV9910B, Application Note AN-H48, Dec. 28, 2007.
D. Rand et al., Issues, Models and Solutions for Triac Modulated Phase Dimming of LED Lamps, Power Electronics Specialists Conference, 2007.
Supertex Inc., HV9931 Unity Power Factor LED Lamp Driver, Application Note AN-H52, Mar. 7, 2007.
Supertex Inc., 56W Off-line LED Driver, 120VAC with PFC, 160V, 350mA Load, Dimmer Switch Compatible, DN-H05, Feb. 2007.
ST Microelectronics, Power Factor Corrector L6561, Jun. 2004.
Fairchild Semiconductor, Application Note 42047 Power Factor Correction (PFC) Basics, Rev. 0.9.0 Aug. 19, 2004.
M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Fairchild Semiconductor, FAN4800, Low Start-up Current PFC/PWM Controller Combos, Nov. 2006.
Fairchild Semiconductor, FAN4810, Power Factor Correction Controller, Sep. 24, 2003.
Fairchild Semiconductor, FAN4822, ZVS Average Current PFC Controller, Aug. 10, 2001.
Fairchild Semiconductor, FAN7527B, Power Factor Correction Controller, 2003.
Fairchild Semiconductor, ML4821, Power Factor Controller, Jun. 19, 2001.

Freescale Semiconductor, AN1965, Design of Indirect Power Factor Correction Using 56F800/E, Jul. 2005.
International Search Report for PCT/US2008/051072, mailed Jun. 4, 2008.
Linear Technology, "Single Switch PWM Controller with Auxiliary Boost Converter," LT1950 Datasheet, Linear Technology, Inc. Milpitas, CA, 2003.
Yu, Zhenyu, 3.3V DSP for Digital Motor Control, Texas Instruments, Application Report SPRA550 dated Jun. 1999.
International Rectifier, Data Sheet No. PD60143-O, Current Sensing Single Channel Driver, El Segundo, CA, dated Sep. 8, 2004.
Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt/://focus.ti.com/lit/ml/slup169/slup169.pdf the whole document.
Erickson et al, Fundamentals of Power Electronics, Chapter 6, Converter Circuits, Kluwer Academic (2001), 54 pps.
International Search Report and Written Opinion for PCT Application No. PCT/US2009/066350, dated Jul. 30, 2010.
R. Ridley, The Nine Most Useful Power Topologies, Oct. 1, 2007, http://www.powersystemsdesign.com/design_tips_oct07.pdf.
Power Integrations, Inc., "TOP200-4/14 TOPSwitch Family Three-terminal Off-line PWM Switch", XP-002524650, Jul. 1996, Sunnyvale, California.
Texas Instruments, SLOS318F, "High-Speed, Low Noise, Fully-Differential I/O Amplifiers," THS4130 and THS4131, US, Jan. 2006.
International Search Report and Written Opinion, PCT US20080062387, dated Feb. 5, 2008.
International Search Report and Written Opinion, PCT US200900032358, dated Jan. 29, 2009.
Hirota, Atsushi et al, "Analysis of Single Switch Delta-Sigma Modulated Pulse Space Modulation PFC Converter Effectively Using Switching Power Device," IEEE, US, 2002.
Prodic, Aleksandar, "Digital Controller for High-Frequency Rectifiers with Power Factor Correction Suitable for On-Chip Implementation," IEEE, US, 2007.
International Search Report and Written Opinion, PCT US20080062378, dated Feb. 5, 2008.
International Search Report and Written Opinion, PCT US20090032351, dated Jan. 29, 2009.
Erickson, Robert W. et al, "Fundamentals of Power Electronics," Second Edition, Chapter 6, Boulder, CO, 2001.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Texas Instruments, SLUS828B, "8-Pin Continuous Conduction Mode (CCM) PFC Controller", UCC28019A, US, revised Apr. 2009.
Analog Devices, "120 kHz Bandwidth, Low Distortion, Isolation Amplifier", AD215, Norwood, MA, 1996.
Burr-Brown, ISO120 and ISO121, "Precision Los Cost Isolation Amplifier," Tucson AZ, Mar. 1992.
Burr-Brown, ISO130, "High IMR, Low Cost Isolation Amplifier," SBOS220, US, Oct. 2001.
International Search Report and Written Report PCT US20080062428 dated Feb. 5, 2008.
Prodic, A. et al, "Dead Zone Digital Controller for Improved Dynamic Response of Power Factor Preregulators," IEEE, 2003.
ST Datasheet L6562, Transition-Mode PFC Controller, 2005, STMicroelectronics, Geneva, Switzerland.
Maksimovic, Regan Zane and Robert Erickson, Impact of Digital Control in Power Electronics, Proceedings of 2004 International Symposium on Power Semiconductor Devices & Ics, Kitakyushu, , Apr. 5, 2010, Colorado Power Electronics Center, ECE Department, University of Colorado, Boulder, CO.
International Preliminary Report on Patentability issued on Jun. 7, 2011, in PCT Application No. PCT/US2009/066350.
Written Opinion issued on Jun. 7, 2011, in PCT Application No. PCT/US2009/066350.
Texas Instruments, Interleaving Continuous Conduction Mode PFC Controller, UCC28070, SLUS794C, Nov. 2007, revised Jun. 2009, Texas Instruments, Dallas TX.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al., International Rectifier, Bridgeless PFC Implementation Using One Cycle Control Technique, 2005.
Linear Technology, LT1248, Power Factor Controller, Apr. 20, 2007.
On Semiconductor, AND8123/D, Power Factor Correction Stages Operating in Critical Conduction Mode, Sep. 2003.
On Semiconductor, MC33260, GreenLine Compact Power Factor Controller: Innovative Circuit for Cost Effective Solutions, Sep. 2005.
On Semiconductor, NCP1605, Enhanced, High Voltage and Efficient Standby Mode, Power Factor Controller, Feb. 2007.
On Semconductor, NCP1606, Cost Effective Power Factor Controller, Mar. 2007.
On Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.
Texas Instruments, Application Report, SLUA309A, Avoiding Audible Noise at Light Loads when using Leading Edge Triggered PFC Converters, Sep. 2004.
Texas Instruments, Application Report SLUA369B, 350-W, Two-Phase Interleaved PFC Pre-Regulator Design Review, Mar. 2007.
Unitrode, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A. R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEE Transactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.
J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.
G. Yao et al., Soft Switching Circuit for Interleaved Boost Converters, IEEE Transactions on Power Electronics, vol. 22, No. 1, Jan. 2007.
C. M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction and FPGA Implementation, IEEE Transactions on Power Electronics, vol. 21, No. 6, Nov. 2006.
H. Wu et al., Single Phase Three-Level Power Factor Correction Circuit with Passive Lossless Snubber, IEEE Transactions on Power Electronics, vol. 17, No. 2, Mar. 2006.
O. Garcia et al., High Efficiency PFC Converter to Meet EN61000-3-2 and A14, Proceedings of the 2002 IEEE International Symposium on Industrial Electronics, vol. 3, 2002.
P. Lee et al., Steady-State Analysis of an Interleaved Boost Converter with Coupled Inductors, IEEE Transactions on Industrial Electronics, vol. 47, No. 4, Aug. 2000.
D.K.W. Cheng et al., A New Improved Boost Converter with Ripple Free Input Current Using Coupled Inductors, Power Electronics and Variable Speed Drives, Sep. 21-23, 1998.
B.A. Miwa et al., High Efficiency Power Factor Correction Using Interleaved Techniques, Applied Power Electronics Conference and Exposition, Seventh Annual Conference Proceedings, Feb. 23-27, 1992.
Z. Lai et al., A Family of Power-Factor-Correction Controllers, Twelfth Annual Applied Power Electronics Conference and Exposition, vol. 1, Feb. 23, 1997-Feb. 27, 1997.
L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.
Fairchild Semiconductor, Application Note 42030, Theory and Application of the ML4821 Average Current Mode PFC Controller, Oct. 25, 2000.
Unitrode Products From Texas Instruments, BiCMOS Power Factor Preregulator, Feb. 2006.
AN-H52 Application Note: "HV9931 Unity Power Factor LED Lamp Driver" Mar. 7, 2007, Supertex Inc., Sunnyvale, CA, USA.
Dustin Rand et al: "Issues, Models and Solutions for Triac Modulated Phase Dimming of LED Lamps" Power Electronics Specialists Confference, 2007. PESC 2007. IEEE, IEEE, p. 1, Jun. 1, 2007, pp. 1398-1404.
Spiazzi G et al: "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.
International Search Report PCT/US2008/062381 dated Feb. 5, 2008.
International Search Report PCT/US2008/056739 dated Dec. 3, 2008.
Written Opinion of the International Searching Authority PCT/US2008/062381 dated Feb. 5, 2008.
Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.
International Search Report PCT/US2008/062398 dated Feb. 5, 2008.
Partial International Search Report PCT/US2008/062387 dated Feb. 5, 2008.
Noon, Jim "UC3855A/B High Performance Power Factor Preregulator", Texas Instruments, SLUA146A, May 1996, Revised Apr. 2004.
International Search Report PCT/GB2006/003259 dated Jan. 12, 2007.
Written Opinion of the International Searching Authority PCT/US2008/056739 dated Dec. 3, 2008.
International Search Report PCT/US2008/056606 dated Dec. 3, 2008.
Written Opinion of the International Searching Authority PCT/US2008/056606 dated Dec. 3, 2008.
International Search Report PCT/US2008/056608 dated Dec. 3, 2008.
Written Opinion of the International Searching Authority PCT/US2008/056608 dated Dec. 3, 2008.
International Search Report PCT/GB2005/050228 dated Mar. 14, 2006.
International Search Report PCT/US2008/062387 dated Jan. 10, 2008.
Data Sheet LT3496 Triple Output LED Driver, Linear Technology Corporation, Milpitas, CA 2007.
Linear Technology, News Release,Triple Output LED, LT3496, Linear Technology, Milpitas, CA, May 24, 2007.
Mamano, Bob, "Current Sensing Solutions for Power Supply Designers", Unitrode Seminar Notes SEM1200, 1999.
http://toolbarpdf.com/docs/functions-and-features-of-inverters.html printed on Jan. 20, 2011.
"HV9931 Unity Power Factor LED Lamp Driver, Initial Release" 2005, Supertex Inc., Sunnyvale, CA USA.
Dustin Rand et al: "Issues, Models and Solutions for Triac Modulated Phase Dimming of LED Lamps" Power Electronics Specialists Conference, 2007. PESC 2007, IEEE, IEEE, p. 1, Jun. 1, 2007, pp. 1398-1404.
Spiazzi G et al: "Analysis of a High-Power-Factor Electronic Ballast for High Brightness Light Emitting Diodes" Power Electronics Specialists, 2005 IEEE 36th Conference on Jun. 12, 2005, Piscatawa, NJ USA, IEEE, Jun. 12, 2005, pp. 1494-1499.
Partial International Search PCT/US2008/062387 dated Feb. 5, 2008.
"High Performance Power Factor Preregulator", Unitrode Products from Texas Instruments, SLUS382B, Jun. 1998, Revised Oct. 2005.
Written Opinion of the International Searching Authority PCT/US2008/056739.
International Search PCT/US2008/062387 dated Jan. 10, 2008.
Data Sheet LT3496 Triple Output LED Driver, 2007, Linear Technology Corporation, Milpitas, CA.
News Release, Triple Output LED, LT3496.

* cited by examiner

US 8,288,954 B2

PRIMARY-SIDE BASED CONTROL OF SECONDARY-SIDE CURRENT FOR A TRANSFORMER

CROSS REFERENCE TO RELATED APPLICATIONS

This application claims the benefit under 35 U.S.C. §119 (e) of U.S. Provisional Application No. 61/120,455, filed Dec. 7, 2008, and entitled "Power Converter With Primary Side Current Control." U.S. Provisional Application No. 61/120,455 includes exemplary systems and methods and is incorporated by reference in its entirety.

BACKGROUND OF THE INVENTION

1. Field of the Invention

The present invention relates in general to the field of signal processing, and more specifically to a system and method that includes primary-side based control of secondary-side current for a transformer.

2. Description of the Related Art

Power control systems often utilize a switching power converter to convert alternating current (AC) voltages to direct current (DC) voltages or DC-to-DC. Power control systems often provide power factor corrected and regulated output voltages to many devices that utilize a regulated output voltage. Switching power converters have been used as interfaces between triac-based dimmers and LOADs. The LOAD can be virtually any load that utilizes converted power, such as one or more light emitting diodes (LEDs).

LEDs are becoming particularly attractive as main stream light sources in part because of energy savings through high efficiency light output and environmental incentives, such as the reduction of mercury. LEDs are semiconductor devices and are driven by direct current. The lumen output intensity (i.e. brightness) of the LED approximately varies in direct proportion to the current flowing through the LED. Thus, increasing current supplied to an LED increases the intensity of the LED and decreasing current supplied to the LED dims the LED. Current can be modified by either directly reducing the direct current level to the white LEDs or by reducing the average current through duty cycle modulation.

FIG. 1 depicts a power control system 100, which includes a switching power converter 102. Voltage source 104 supplies an alternating current (AC) input voltage $V_{in}$ to a full bridge diode rectifier 106. Capacitor 107 provides high frequency filtering. The voltage source 104 is, for example, a public utility, and the AC voltage $V_{in}$ is, for example, a 60 Hz/110 V line voltage in the United States of America or a 50 Hz/220 V line voltage in Europe. The rectifier 106 rectifies the input voltage $V_{in}$ and supplies a rectified, time-varying, line input voltage $V_X$ to the switching power converter 102.

The power control system 100 includes a controller 108 to regulate an output voltage $V_L$ of switching power converter 102 and control a primary-side transformer interface 116. Voltage $V_L$ is referred to as a "link voltage". Controller 108 generates a pulse-width modulated control signal $CS_0$ to control conductivity of switch 110 and, thereby, control conversion of input voltage $V_X$ to link voltage $V_L$. Switch 110 is a control switch. The controller 108 controls an ON (i.e. conductive) and OFF (i.e. nonconductive) state of switch 110 by varying a state of pulse width modulated control signal $CS_0$. Switching power converter 102 can be any of a variety of types, such as a boost converter. Controller 108 utilizes feedback signals $V_{X\_FB}$ and $V_{L\_FB}$ to generate switch control signal $CS_0$ to regulate the link voltage $V_L$. Feedback signal $V_{X\_FB}$ represents input voltage $V_X$, feedback signal $V_{L\_FB}$ represents link voltage $V_L$.

Power control system 100 includes an isolation transformer 112 to isolate the primary-side 122 and secondary-side 124 of power control system 100. Depending upon the type of switching power converter 102, the link voltage $V_L$ is either a multiple or a fraction of the input voltage $V_X$. For a boost type switching power converter 102, the link voltage $V_L$ can be several hundred volts. Often the LOAD 114 does not require such high voltages. Transformer 112 steps down the link voltage $V_L$ to a lower secondary voltage $V_S$. A lower secondary voltage $V_S$ can have several advantages. For example, lower voltages are generally safer. Additionally, LOAD 114 may have a metal heat sink, such as a heat sink to dissipate heat from one or more LEDs. The cost of insulation requirements implemented by regulatory associations for LOAD 114 generally decreases as the secondary voltage $V_S$ decreases below various voltage thresholds. Therefore, a lower voltage across LOAD 114 can lower manufacturing costs.

The power control system 100 includes a primary-side transformer interface 116 between the switching power converter 102 and the primary-side of transformer 112. Since link voltage $V_L$ is a regulated, generally constant voltage over a period of time, the primary-side transformer interface 116 converts the link voltage $V_L$ into a time-varying voltage $V_P$. The transformer 112 induces the secondary-side voltage $V_S$ from the primary voltage $V_P$. A variety of topologies for interfaces 116 exist, such as half-bridge, full-bridge, and push-pull interfaces. The primary-side interface 116 includes one or more switches (not shown) arranged in accordance with the topology of interface 116. The controller 108 generates pulse width modulated switch control signals $\{CS_1 \ldots CS_M\}$ to control the respective conductivity of switches (not shown) in interface 116. The set of switch control signals $\{CS_1 \ldots CS_M\}$ allows the interface 116 to convert the link voltage $V_L$ into the primary-side voltage $V_P$, which can be passed by transformer 112. Thus, the control signals $\{CS_1 \ldots CS_M\}$ control the coupling of the primary-side voltage $V_P$ to the secondary-side 124. Exemplary primary-side transformer interfaces 116 are discussed in chapter 6 of *Fundamentals of Power Electronics—Second Edition* by Erickson and Maksimović, publisher Springer Science+Business Media, LLC, copyright 2001 ("*Fundamentals of Power Electronics*"). The power control system 100 also includes a secondary-side transformer interface 118 between the secondary-side of transformer 112 and LOAD 114 to convert the secondary voltage $V_S$ into an output voltage $V_{OUT}$. A variety of interfaces 118 exist, such as half-bridge buck converter and full-bridge buck converters. Exemplary secondary-side transformer interfaces 118 are also discussed in chapter 6 of *Fundamentals of Power Electronics*.

For a load 114 that utilizes a regulated secondary-side current $i_{LOAD}(t)$, controller 108 regulates the link voltage $V_L$ and the primary-side voltage $V_P$ to establish a particular value for secondary-side load current $i_{LOAD}(t)$. The secondary-side current $i_{LOAD}(t)$ is a function of an integral of the primary-side voltage $V_P$ over time. Controller 108 regulates the primary-side voltage $V_P$ by controlling the duty cycles of control signals $\{CS_1 \ldots CS_M\}$. If the value of secondary side current $i_{LOAD}(t)$ is too large, controller 108 decreases the duty cycle of control signals $\{CS_1 \ldots CS_M\}$, and, if the value of secondary side current $i_{LOAD}(t)$ is too small, controller 108 increases the duty cycle D of control signals $\{CS_1 \ldots CS_M\}$. For a transformer with $N_P$ primary-side windings and $N_S$ secondary-side windings, the primary-side voltage $V_P$ and the secondary side voltage $V_S$ are related to each other in accordance with Equation [1], where $N_P$ and $N_S$ represent the respective number of primary-side and secondary-side windings:

$$V_P \cdot N_S = V_S \cdot N_P \quad [1].$$

For an ideal transformer, the primary-side current $i_P(t)$ and the secondary-side windings current $i_S(t)$ are related in accordance with Equation [2]:

$$i_P(t) \cdot N_P - i_S(t) \cdot N_S = 0 \quad [2].$$

The secondary-side windings current $i_S(t)$ is one example of a secondary-side current. The secondary-side windings current $i_S(t)$ is the current in the secondary windings of transformer 112. The secondary-side load current $i_{LOAD}(t)$ also represents a secondary-side current. The secondary-side load current $i_{LOAD}(t)$ is a function of the secondary-side windings current $i_S(t)$ as modified by the secondary-side transformer interface 118.

For a real transformer 112, the primary-side current $i_P(t)$ has a magnetizing current component, $i_M(t)$. Equation [3] depicts a relationship between the primary-side current $i_P(t)$ and the magnetizing current component $i_M(t)$:

$$i_P(t) = i_P'(t) + i_M(t) \quad [3].$$

The current $i_P'(t)$ is related to the secondary-side windings current $i_S(t)$ in accordance with Equation [4]:

$$i_P'(t) = i_S(t) \cdot N_S / N_P \quad [4].$$

Thus, the primary-side current $i_P(t)$ is related to the secondary-side windings current $i_S(t)$ in accordance with Equation [5]:

$$i_P(t) = i_S(t) \cdot N_S / N_P + i_M(t) \quad [5].$$

In at least one embodiment, the magnetizing current on the primary-side of transformer 112 is not directly measurable. Accordingly, it is very difficult to monitor changes in the secondary-side load current $i_{LOAD}(t)$ without actually sampling the secondary-side current $i_{LOAD}(t)$.

To regulate the secondary-side load current $i_{LOAD}(t)$, controller 108 utilizes feedback signal $i_{LOAD}(t)\_FB$ to generate switch control signals $CS_1 \ldots CS_M$. Feedback signal $i_{LOAD}(t)\_FB$ represents the secondary-side load current $i_{LOAD}(t)$. Power control system 100 includes coupler 120 to receive feedback signal $i_{LOAD}(t)_{FB}$. The feedback signal $i_{LOAD}(t)\_FB$ is, for example, a current or voltage that represents the value of secondary-side current $i_{LOAD}(t)$. Coupler 120 is, for example, an optical coupler that maintains isolation between the primary-side 122 and secondary-side 124 of power control system 100. In another embodiment, coupler 120 is a resistor. When using a resistor, insulation of LOAD 114 and other components can be used to address safety concerns. In any event, the coupler 120 and any auxiliary materials, such as insulation, add cost to power control system 100.

Some conventional electronic systems, such as electronic system 100, limit the secondary-side load current $i_{LOAD}(t)$ to protect load 114. To simply limit secondary-side load current $i_{LOAD}(t)$, controller 108 can limit secondary-side load current $i_{LOAD}(t)$ by observing the primary-side current $i_P(t)$ without receiving feedback signal $i_{LOAD}(t)\_FB$. The controller 108 can compare a peak target value of primary-side current $i_P(t)$ and the observed primary-side current $i_P(t)$, and limit the primary-side current $i_P(t)$ to the peak target value. Limiting the primary-side current $i_P(t)$ limits the secondary side load current $i_{LOAD}(t)$. However, because of many variables, such as the magnetizing current $i_M(t)$ and variations in the duty cycles of switch control signal $CS_1 \ldots CS_M$ due to ripple in the input voltage $V_X$ and link voltage $V_L$, limiting the secondary-side load current $i_{LOAD}(t)$ based on a peak target value of primary-side current $i_P(t)$ results in controlling the secondary-side load current with, for example, a 15-50% margin of error. Thus, limiting the secondary-side current $i_{LOAD}(t)$ does not regulate the secondary-side current $i_{LOAD}(t)$.

SUMMARY OF THE INVENTION

In one embodiment of the present invention, an apparatus includes a controller to regulate a load current to a load coupled to a secondary-side of a transformer to an approximately average value based on an observed primary-side signal value. The controller is configured to generate one or more duty cycle modulated switch control signals to control a voltage on a primary-side of the transformer based on the primary-side signal value. The load current represents a current into the load and out of a filter. The filter is coupled to a rectifier, and the rectifier is coupled to the secondary-side of the transformer.

In another embodiment of the present invention, a method includes regulating a load current to a load coupled to a secondary-side of a transformer to an approximately average value based on an observed primary-side signal value. Regulating the output current includes generating one or more duty cycle modulated switch control signals to control a voltage on a primary-side of the transformer based on the primary-side signal value. The load current represents a current into the load and out of a filter. The filter is coupled to a rectifier, and the rectifier is coupled to the secondary-side of the transformer.

In a further embodiment of the present invention, an electronic system includes a controller. The controller is configured to receive a feedback signal from a primary-side of a transformer, wherein the feedback signal represents a current in the primary-side of the transformer. The controller is further configured to generate control signals for circuitry coupled to the primary-side of the transformer to regulate a load current on a secondary-side of the transformer to an approximately average value based on the feedback signal from the primary-side of the transformer without using a feedback signal from a secondary-side of the transformer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
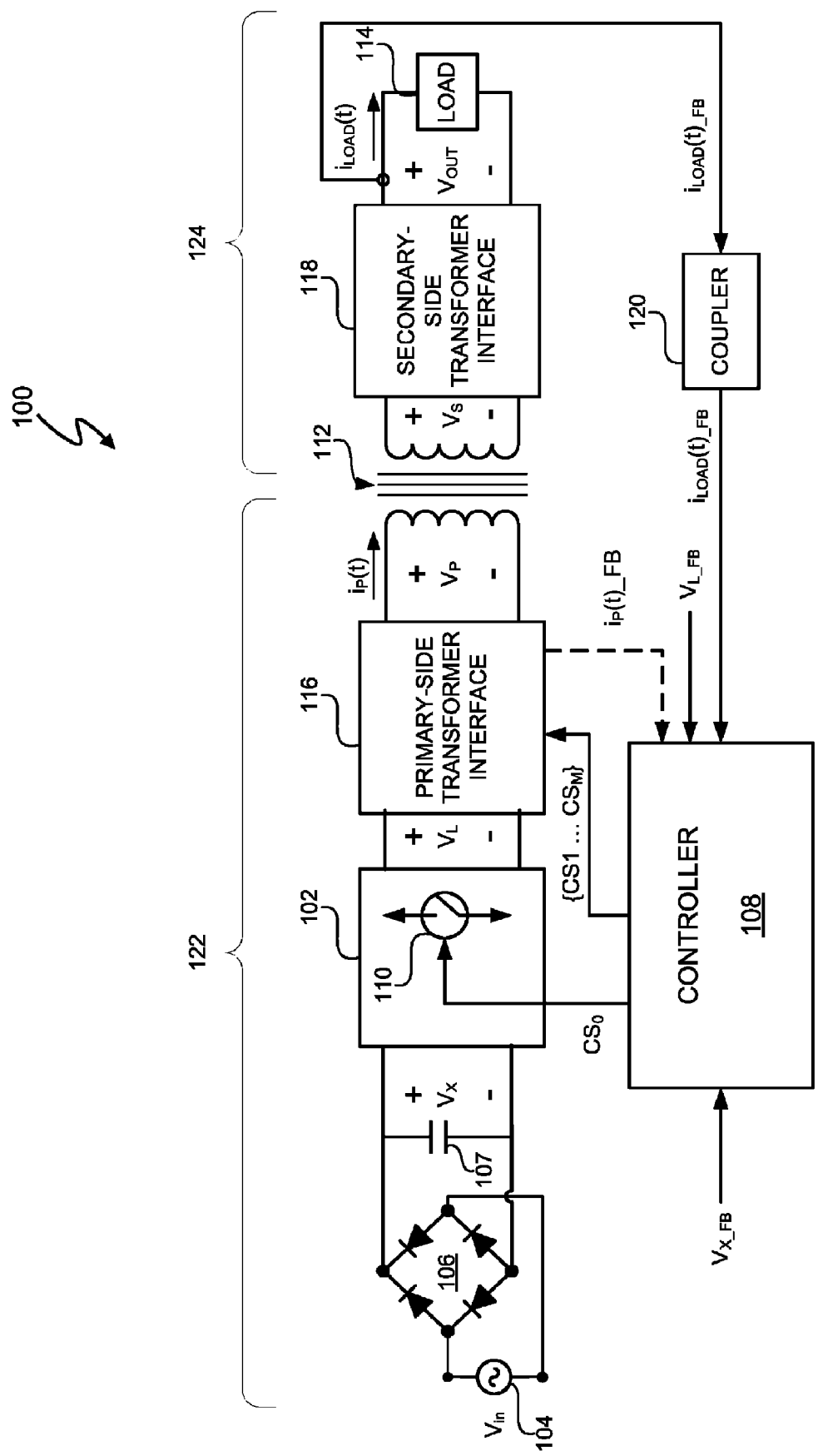
FIG. 1 (labeled prior art) depicts a power control system with transformer isolation and secondary-side current feedback.

In at least one embodiment, a power control system includes a transformer, such as an isolation transformer, and a controller regulates a current on a secondary-side of the transformer based on an observed primary-side signal value. In at least one embodiment, the controller is configured to generate one or more duty cycle modulated switch control signals to control a voltage on a primary-side of the transformer based on the observed primary-side signal value and the secondary-side current represents a load current into a load and out of a filter coupled to a rectifier coupled to the secondary-side of the transformer. In at least one embodiment, the load includes one or more LEDs. In at least one embodiment, the primary-side signal value is a sample of a current in the primary-side windings of the transformer. "Regulation" of a particular signal means that the signal can be controlled with less than a 10% error. In at least one embodiment, the controller regulates the load current within 10% of a target value. In at least one embodiment, the controller regulates the load current within 5% of the target value. It is possible to regulate within closer limits, such as within 1%, 2%, 3%, or 4%. Generally closer regulation requires more expensive components. Unlike peak current limiting, in at least one embodiment, there is no theoretical limit to the regulation that can be achieved by the power control system described herein.

In at least one embodiment, the primary-side signal value represents an observed value, such as a sampled value, of a primary-side transformer current. In at least one embodiment, proper timing of the sampling of the primary-side signal value substantially eliminates contributions of a transformer magnetizing current from the primary-side transformer current sample. Sampling the primary-side signal value when contributions of the transformer magnetizing current are substantially eliminated allows at least an average of the secondary-side current to be determined from the primary-side signal value. "Substantially eliminated" means completely eliminated or reduced to a point where the influence of the magnetizing current does not prevent regulation of the secondary-side current based on the primary-side signal value. In at least one embodiment, the primary-side transformer current is sampled at a midpoint of a pulse of at least one of the switch control signals. In at least one embodiment, the midpoint of the pulse coincides with an average value of the secondary-side current and coincides with a zero value magnetizing current. With a zero value magnetizing current, the primary-side transformer current and the secondary-side current are directly related by the turns ratio of the isolation transformer. Because the turns ratio is an easily obtainable, fixed number, in at least one embodiment, the controller can accurately control the secondary-side current based on the primary-side signal value, such as the primary-side transformer current sample, without using a value of an input voltage at the primary-side or inductance values on the primary and secondary sides of the transformer and without a secondary-side current feedback signal.

In at least one embodiment, basing control of the secondary-side current on a primary-side signal value without using a secondary-side feedback signal reduces costs and increase operational efficiency of the electronic system utilizing the controller. In another embodiment, an average of the primary-side transformer current during one or more pulses of at least one of the switch control signals corresponds to an average value of the secondary-side transformer current. In another embodiment, an average of the primary-side transformer current during one or more periods of at least one of the switch control signals corresponds to an average value of the secondary-side transformer current.

The controller is configured to generate the one or more switch control signals based on the primary-side signal value. In at least one embodiment, the controller utilizes the primary-side signal value to generate one or more switch control signals to control a voltage on a primary-side of the transformer. In at least one embodiment, the voltage controlled is a voltage across primary-side windings of the transformer. In at least one embodiment, the controller regulates an output current on a secondary-side of the transformer to an approximately average value. Regulation of the output current can be accomplished in any number of ways. For example, in at least one embodiment, the controller regulates the output current on the secondary-side of the transformer by adjusting a duty cycle of at least one of the one or more switch control signals.

Figure 2:
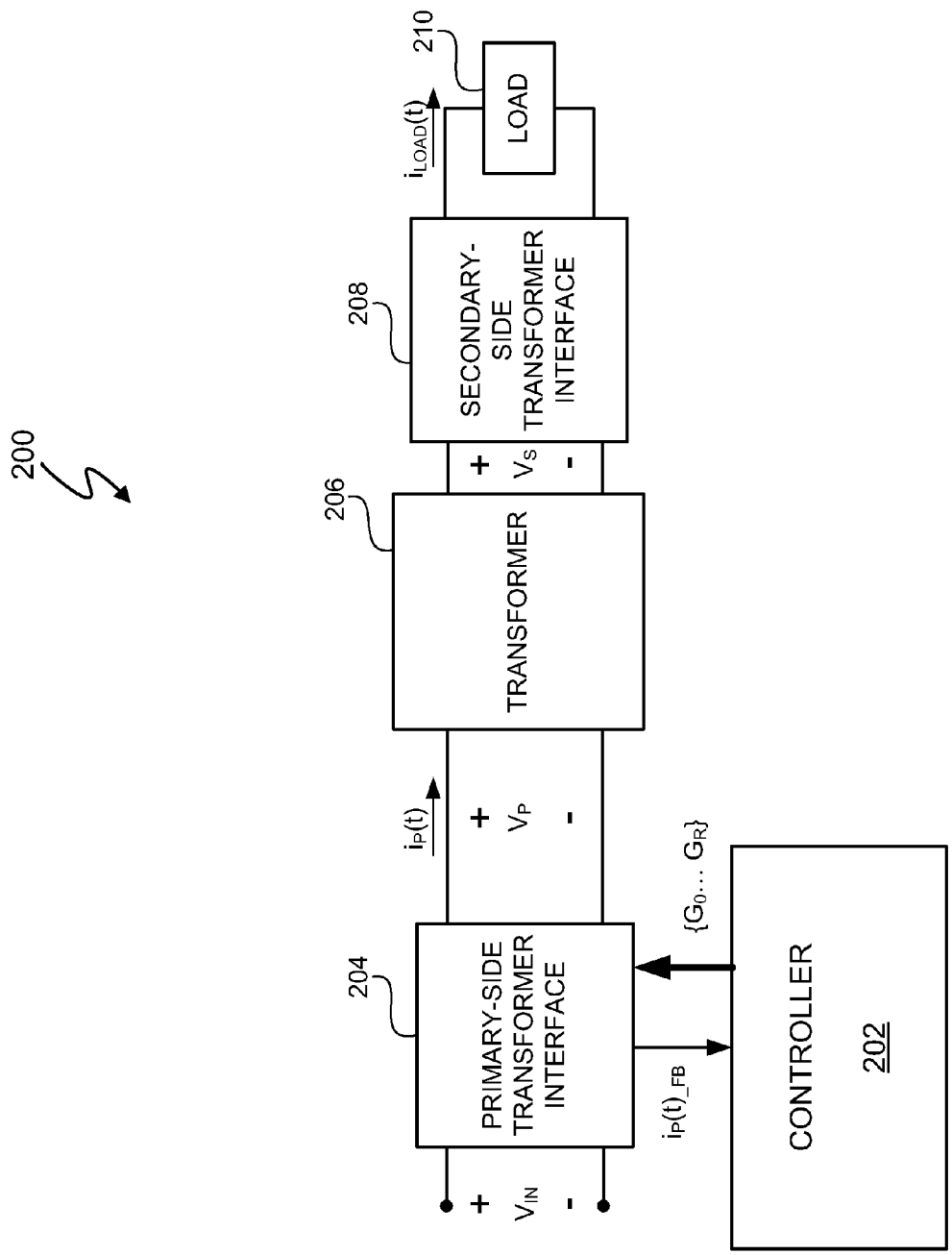
FIG. 2 depicts a power control system that includes a controller to set a value of a secondary-side current based on primary-side signal value.

FIG. 2 depicts a power control system 200 that includes a controller 202 to regulate an approximately average value of an exemplary secondary-side current, such as secondary-side load current $i_{LOAD}(t)$, based on a primary-side signal value, such as primary-side current feedback signal $i_P(t)\_{FB}$. The term "approximately average" indicates the value is either the average value or differs from the average value by an amount resulting from precision limitations in circuitry used to observe and/or determine the primary-side signal value. In at least one embodiment, "observing" includes any form of monitoring, sampling, inspecting, obtaining, or detecting or any combination thereof. Controller 202 generates switch control signals $G_0 \ldots G_R$ to modulate the primary-side transformer voltage $V_P$. In at least one embodiment, the switch control signals $G_0 \ldots G_R$ are duty cycle modulated switch control signals, such as pulse width modulated switch control signals.

In at least one embodiment, proper timing of the sampling of the primary-side feedback signal $i_P(t)\_{FB}$ eliminates contributions of a transformer magnetizing current from the primary-side transformer current. For example, by sampling the primary-side feedback signal $i_P(t)\_{FB}$ at a midpoint of pulses of at least one of the control signals $G_0 \ldots G_R$, the primary-side current $i_P(t)$ is directly related to the secondary-side winding current $i_S(t)$ by the turns ratio $N_S/N_P$, i.e. $i_P(t) \cdot N_S/N_P = i_S(t)$. The relationship between the secondary-side current $i_S(t)$ and the load current $i_{LOAD}(t)$ is also a known function of the transfer function of the secondary-side transformer interface 208. The particular transfer function is a function of the components in the secondary-side transformer interface 208.

The input voltage $V_{IN}$ is supplied to the primary-side transformer interface 204, and primary-side transformer interface 204 converts the input voltage $V_{IN}$ into a time-varying primary-side voltage $V_P$. The source of the input voltage $V_{IN}$ can be any source. In at least one embodiment, the input voltage $V_{IN}$ is a regulated output voltage of a switching power converter (not shown).

The transformer 206 induces the secondary-side voltage $V_S$ from the primary-side voltage $V_P$. Transformer 206 includes $N_P$ primary winding turns and $N_S$ secondary winding turns, where $N_P$ and $N_S$ respectively represent the number of primary and secondary winding turns. The primary-side voltage $V_P$ and secondary-side voltage $V_S$ are related to each in accordance with Equation [1]. The secondary-side transformer interface 208 generates an output voltage, which causes the secondary-side current $i_{LOAD}(t)$ to flow into load 210. In at least one embodiment, load 210 includes one or more LEDs.

The midpoint of the pulses of control signals $G_0 \ldots G_R$ coincides with an average value of the secondary-side load current $i_{LOAD}(t)$ and also coincides with a zero value magnetizing current of transformer 206. With a zero value magnetizing current, the primary-side transformer current and the secondary-side current are directly related by the turns ratio of the isolation transformer. Because the turns ratio is an easily obtainable, fixed number, in at least one embodiment, the controller can accurately control the secondary-side currents $i_S(t)$ and $i_{LOAD}(t)$ based on the primary-side signal value, such as the primary-side transformer feedback signal $i_P(t)\_{FB}$, without using a value of input voltage $V_{IN}$ or inductance values on the primary and secondary sides of transformer 206 and without a secondary-side current feedback signal. In at least one embodiment, controller 202 compensates for circuit non-idealities of, for example, the primary-side primary transformer interface to sample the primary-side transformer feedback signal $i_P(t)\_{FB}$. For example, system delays, such as delays caused by parasitic capacitances, can cause delays between the correlation of the midpoint of switch control signals $G_0 \ldots G_R$ and the sample of the primary-side transformer feedback signal $i_P(t)\_{FB}$. Thus, in at least one embodiment, to increase the accuracy of the regulation of the secondary-side current, controller 202 compensates for the system delays.

In another embodiment, an average of the primary-side current $i_P(t)$ during one or more pulses of at least one of the switch control signals $G_0 \ldots G_R$ corresponds to an average value of the secondary-side load current $i_{LOAD}(t)$. In another embodiment, an average of the primary-side transformer feedback signal $i_P(t)$ during one or more periods of at least one of the switch control signals $G_0 \ldots G_R$ corresponds to an average value of the secondary-side transformer load current $i_{LOAD}(t)$.

In at least one embodiment, the controller 202 generates switch control signals $G_0 \ldots G_R$ to modulate the primary-side transformer voltage $V_P$, where R+1 represents the number of switch control signals and R is greater than or equal to zero. Changing the duty cycle of the primary-side transformer voltage $V_P$ changes the secondary-side voltage $V_S$ and, thus, changes the secondary-side current $i_{LOAD}(t)$. The particular value of R is a matter of design choice and depends, for example, on the type of primary-side transformer interface 204. Primary-side transformer interface 204 can be any type of interface such as a push-pull, full bridge, or half-bridge interface. Secondary-side transformer interface 208 can also be any type of interface such as a half-bridge/buck converter. The particular type of transformer interfaces is a matter of design choice and depends, for example, on the type of load 210 and desired characteristics of, for example, secondary-side current $i_{LOAD}(t)$. Load 210 can be any type of load including one or more LEDs arranged in one or more serial or parallel strings.

Figure 3:
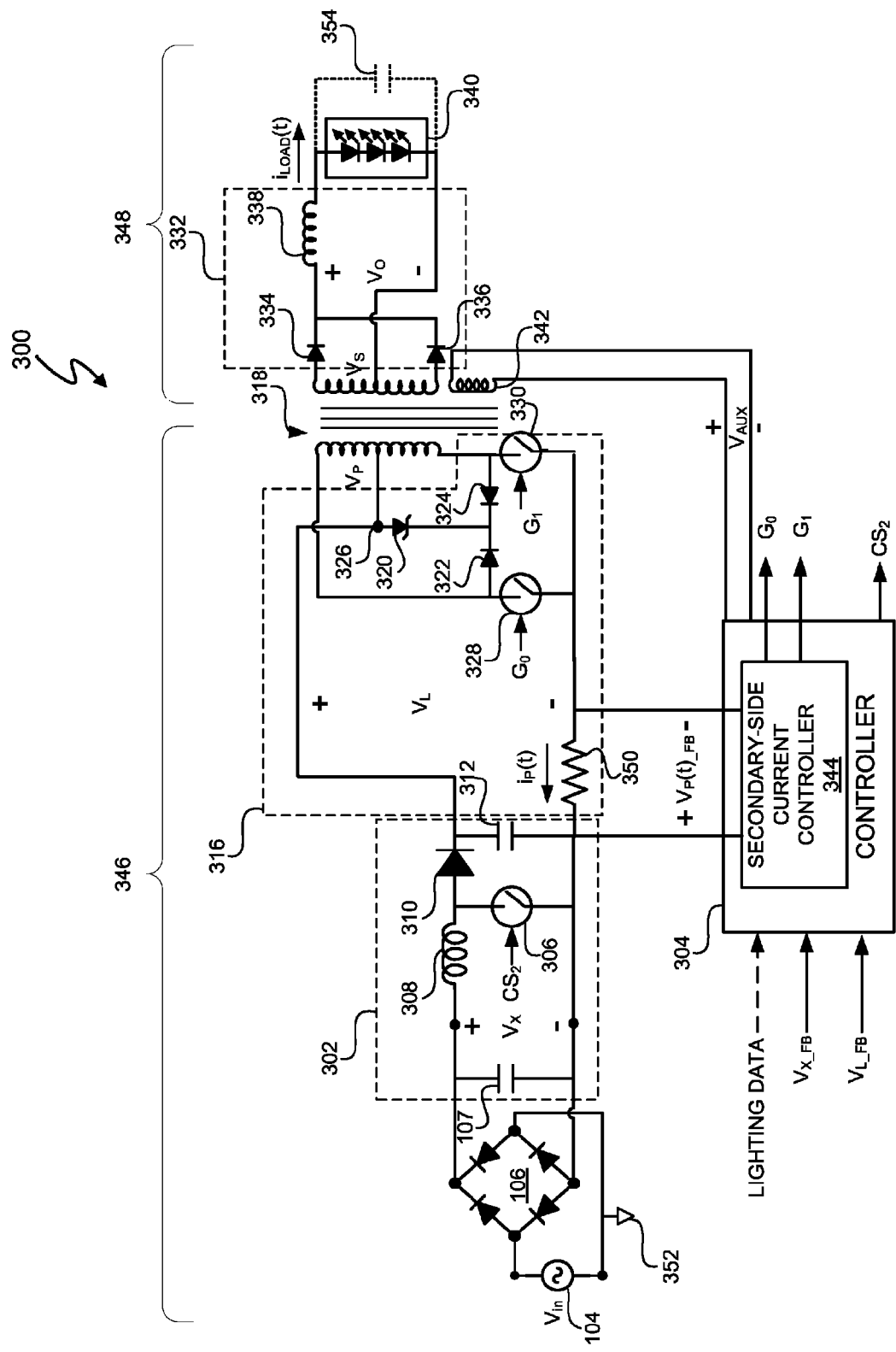
FIG. 3 depicts an embodiment of the power control system of FIG. 2 and a boost-type switching power converter.

FIG. 3 depicts power control system 300. Power control system 300 represents one embodiment of power control system 200 and also includes a boost-type switching power converter 302. In at least one embodiment, controller 304 generates switch control signal $CS_2$ to control switch 306 to regulate the link voltage $V_L$ and to provide power factor correction. U.S. patent application Ser. No. 11/967,269, entitled "POWER CONTROL SYSTEM USING A NONLINEAR DELTA-SIGMA MODULATOR WITH NONLINEAR POWER CONVERSION PROCESS MODELING", filed Dec. 31, 2007, inventor John L. Melanson, and assignee Cirrus Logic, Inc. (referred to herein as "Melanson I") describes exemplary control of switching power converter 302. In general, switch control signal $CS_2$ causes switch 306 to conduct, and the voltage across inductor 308 increases. When switch control signal $CS_2$ controls switch 306 to stop conducting, current flows through diode 310 and charges capacitor 312 towards a sum of the input voltage $V_X$ and the voltage across inductor 308. The voltage across capacitor 312 is the link voltage $V_L$. Capacitor 312 is sized so as to maintain an approximately constant link voltage $V_L$. In at least one embodiment, switch control signal $CS_2$ is also modulated to provide power factor correction. The link voltage $V_L$ can be any voltage that is sufficient to drive load 340. In at least one embodiment, link voltage $V_L$ is approximately 200 V. In at least one embodiment, controller 304 utilizes feedback signals $V_{X\_FB}$ and $V_{L\_FB}$ to generate switch control signal $CS_2$. Feedback signal $V_{X\_FB}$ represents input voltage $V_X$, feedback signal $V_{L\_FB}$ represents link voltage $V_L$.

A push-pull circuit 316 represents one embodiment of primary-side transformer interface 204. Push-pull circuit 316 generates a primary-side transformer voltage to induce a secondary-side voltage in the secondary-side windings of transformer 318. Transformer 318 is an isolation transformer that provides isolation between the primary-side 346 and secondary-side 348. Push-pull circuit includes Zener diode 320 and diodes 322 and 324 configured as a snubber circuit to provide stability at voltage node 326. Push-pull circuit 316 also includes switches 328 and 330 having conductivity that is respectively controlled by switch control signals $G_0$ and $G_1$. As subsequently explained in more detail, switch control signals $G_0$ and $G_1$ control the secondary-side current $i_{LOAD}(t)$. Transistors 328 and 330 represent one type of switch. The type of switches 328 and 330 is a matter of design choice. In at least one embodiment, switches 328 and 330 are n-channel field effect transistors.

Secondary-side transformer interface 332 includes diodes 334 and 336 plus inductor 338 arranged in a half-bridge, buck converter configuration. Inductor 338 represents one embodiment of a filter at the output of the rectifier 334. Any filter can be utilized. For example, in at least one embodiment, the filter also includes an optional capacitor 354 (shown in dotted lines) to form an LC filter. Secondary-side transformer interface 332 represents one embodiment of secondary-side transformer interface 208. Load 340 includes three LEDs. Power control system 300 also includes optional auxiliary secondary windings 342 to provide auxiliary power to controller 304.

Figure 4:
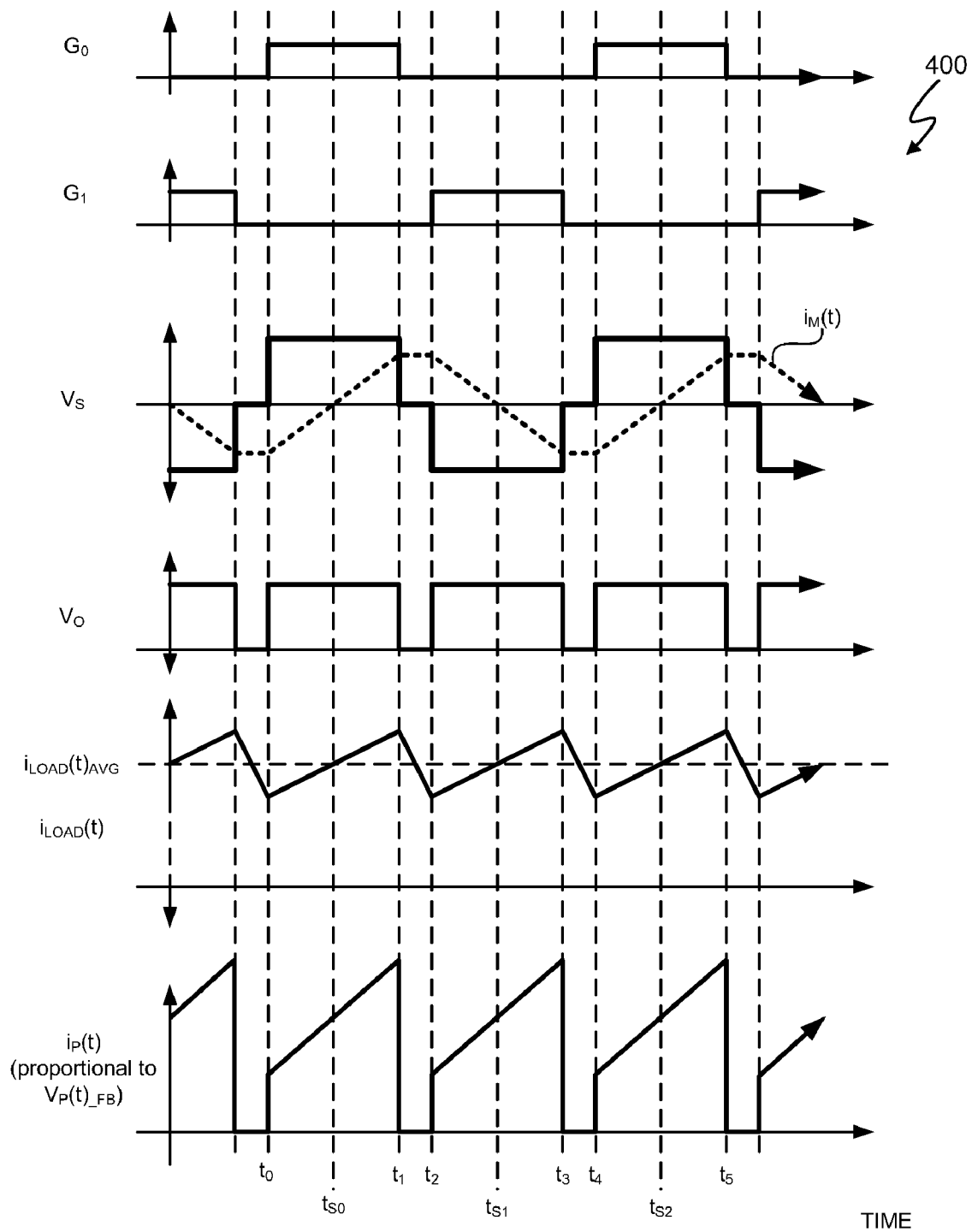
FIG. 4 depicts exemplary power control system signals occurring during operation of the power control system of FIG. 3.
Figure 5:
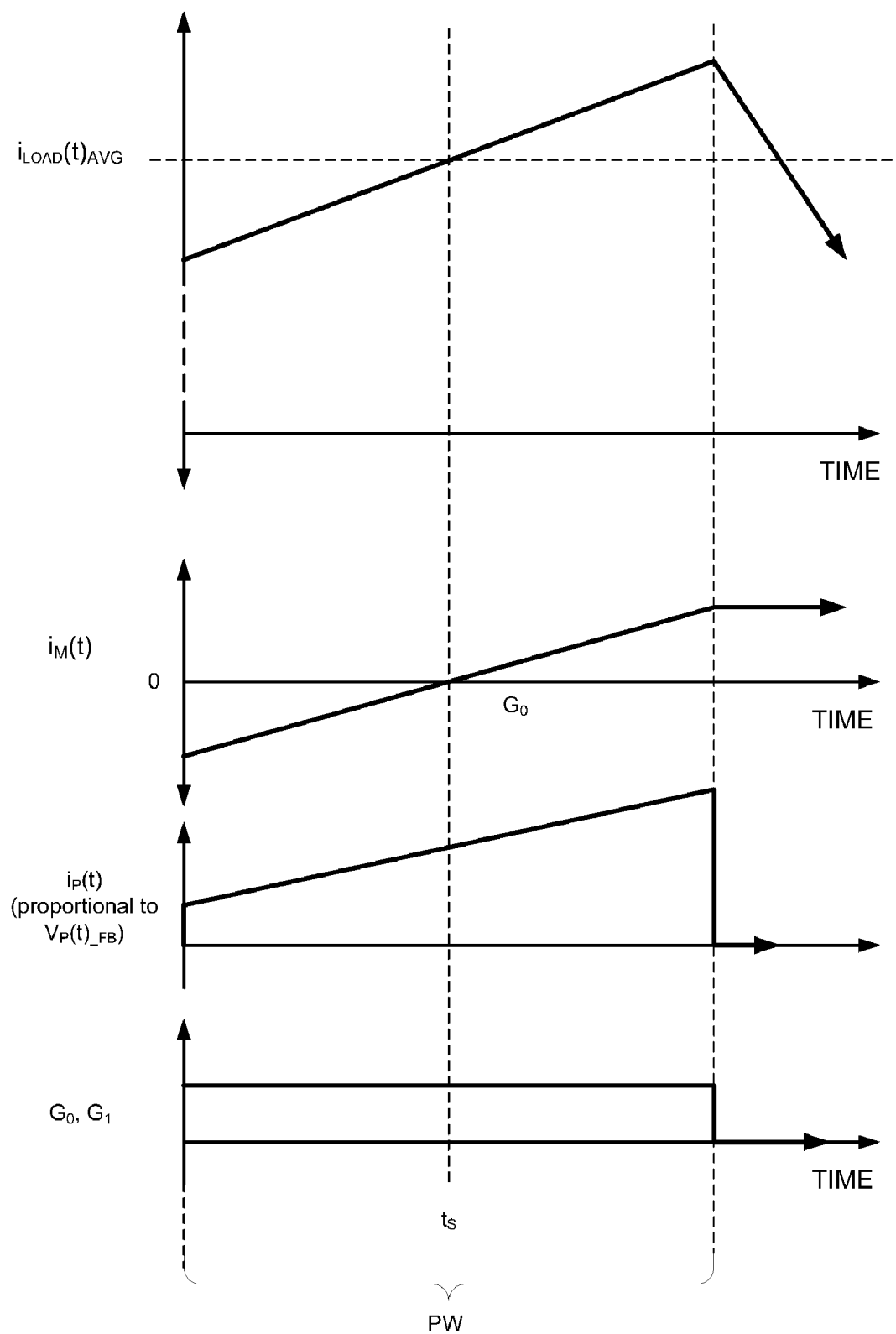
FIG. 5 depicts relationships between an average secondary-side current, a magnetizing current, switch control signals, and a primary-side current during one pulse of the switch control signals.

FIG. 4 depicts power control system signals 400, which represent exemplary signals occurring during operation of power control system 300. FIG. 5 depicts the relationships between the average secondary-side current $i_{LOAD}(t)_{AVG}$, the magnetizing current $i_M(t)$, the switch control signals $G_0$ and $G_1$, and the primary-side current $i_P(t)$ during one pulse of switch control signals $G_0$ and $G_1$. Referring to FIGS. 3, 4, and 5, controller 304 includes a secondary-side current controller 344 to control the primary-side voltage $V_P$. The secondary-side current controller 344 generates duty cycle modulated switch control signals $G_0$ and $G_1$ based on a primary-side signal value, which in one embodiment is feedback voltage $V_P(t)\_{FB}$. Sense resistor 350 is connected between switches 328 and 330 and a voltage reference 352, such as a ground reference voltage. The primary current $i_P(t)$ develops the feedback voltage $V_P(t)\_{FB}$ across sense resistor 350. The resistance value of sense resistor 350 is a matter of design choice. In at least one embodiment, the value of sense resistor 350 is designed to provide a voltage drop, such as a few tenths of a volt, that is sufficiently large to be observed by secondary-side current controller 344. Because of $i^2R$ losses across sense resistor 504 and a primary-side voltage being higher than secondary-side voltage $V_S$, locating sense resistor 350 on the primary-side 346 is more efficient due to, for example, lower thermal losses, relative to locating sense resistor 350 on the secondary-side 348. Additionally, in at least one embodiment, locating sense resistor 350 on the primary-side 350 eliminates primary-to-secondary-side feedback coupling and/or extra insulation for load 340, thus, reducing component costs.

The secondary-side current controller 344 alternates pulses of switch control signals $G_0$ and $G_1$ so that the primary voltage $V_P$ and secondary voltage $V_S$ cycles between positive and negative values. FIG. 4 depicts the secondary voltage $V_S$. The primary voltage $V_P$, not shown in FIG. 4, is a scaled version of the secondary voltage $V_S$ in accordance with Equation [1]. The number of primary windings $N_P$ and the number of secondary windings $N_S$ is a matter of design choice and depends on the value of the link voltage $V_L$ and the desired maximum secondary-side voltage $V_S$.

During a pulse of switch control signal $G_0$, such as between times $t_0$ and $t_1$, switch 328 conducts and causes secondary-side voltage $V_S$ to pulse positive. The magnetizing current $i_M(t)$ is related to the integral of the secondary-side voltage $V_S$. So, when the secondary-side voltage $V_S$ pulses positive, the magnetizing current $i_M(t)$ ramps up. From times $t_1$ to $t_2$, secondary-side current controller 344 drives both switch control signals $G_0$ and $G_1$ low and the secondary-side voltage $V_S$ drops to zero. When the secondary-side voltage $V_S$ is zero, the magnetizing current $i_M(t)$ remains essentially unchanged. From times $t_2$ to $t_3$, switch control signal $G_0$ is low, and switch control signal $G_1$ pulses high causing the secondary voltage $V_S$ to drop to a negative value. When the secondary voltage $V_S$ drops to the negative value, the magnetizing current $i_M(t)$ ramps down. The average value of the secondary voltage $V_S$ is zero, so at the midpoint of each pulse of secondary voltage $V_S$, e.g. at times $t_{S0}$, $t_{S1}$, and $t_{S2}$, the value of the magnetizing current $i_M(t)$ is also zero. In at least one embodiment, controller 304 compensates for system delays due to, for example, parasitic capacitances in primary-side transformer interface 316 when sampling the feedback voltage $V_P(t)\_{FB}$ by sampling the feedback voltage $V_P(t)\_{FB}$ at the midpoint times $t_{S0}$, $t_{S1}$, and $t_{S2}$ plus the system delay. Thus, the sampled feedback voltage $V_P(t)\_{FB}$ corresponds to the midpoint times when the magnetizing current $i_M(t)$ is zero. The midpoint of each pulse of secondary voltage $V_S$ corresponds with the midpoint of each pulse of switch control signals $G_0$ and $G_1$. Since secondary-side current controller 344 controls the timing of switch control signals $G_0$ and $G_1$, the midpoint times $t_{S0}$, $t_{S1}$, and $t_{S2}$ and, thus, the times at which the magnetizing current $i_M(t)$ is zero is known by secondary-side controller 344. In at least one embodiment, the secondary-side controller 344 includes a memory or can access a memory that stores the values of $N_S$, $N_P$, and the value $R_S$ of sense resistor 350 and includes a processor, either analog, digital, or mixed analog and digital.

The half-bridge configuration of diodes 334 and 336 rectifies the secondary-side voltage $V_S$ to generate a square wave output voltage $V_O$ between diode 334 and inductor 338. The secondary-side current $i_{LOAD}(t)$ is a function of an integral of output voltage $V_O$, so the secondary-side current ramps up when output voltage $V_O$ pulses high, such as between times $t_0$ and $t_1$, and ramps down when output voltage $V_O$ drops to zero, such as between times $t_1$ and $t_2$. The midpoints of the secondary-side current $i_{LOAD}(t)$ occur at the midpoint times, e.g. $t_{S0}$, $t_{S1}$, and $t_{S2}$, of switch control signals $G_0$ and $G_1$ when the magnetizing current $i_M(t)$ is zero. The midpoints of the secondary-side current $i_{LOAD}(t)$ represent an average value $i_P(t)_{AVG}$ of secondary-side current $i_{LOAD}(t)$.

In at least one embodiment, the primary-side current $i_P(t)$ is related to the secondary-side windings current $i_S(t)$ in accordance with Equation [5]. In at least one embodiment, the secondary-side current controller 344 observes the primary-side current $i_P(t)$ via the primary-side signal value voltage $V_P(t)\_{FB}$ at the midpoint times of switch control signals $G_0$ and $G_1$ (and, thus, at the midpoint times of secondary-side current $i_{LOAD}(t)$). In at least one embodiment, the magnetizing current $i_M(t)$ is not directly measurable. However, since the magnetizing current $i_M(t)$ is zero at the midpoint times, e.g. $t_{S0}$, $t_{S1}$, and $t_{S2}$, Equation [5] becomes Equation [6] at the midpoint times, e.g. $t_{S0}$, $t_{S0}$, and $t_{S2}$:

$$i_P(t) = i_S(t) N_S / N_P \quad [6], \text{ and}$$

$$i_P(t) = i_{LOAD}(t)_{AVG} N_S / N_P \quad [7].$$

Equation [7] is true at the midpoint times, e.g. $t_{S0}$, $t_{S1}$, and $t_{S2}$. The value of the primary-side current $i_P(t)$, and, thus, the average value of the secondary-side current $i_{LOAD}(t)$, is determined by the duty cycle of the switch control signals $G_0$ and $G_1$. Increasing the duty cycle of switch control signals $G_0$ and $G_1$ increases the value of primary-side current $i_P(t)$, and, thus, increases the average value of secondary-side current value $i_{LOAD}(t)_{AVG}$. Decreasing the duty cycle of switch control signals $G_0$ and $G_1$ decreases the value of primary-side current $i_P(t)$, and, thus, decreases the average value of secondary-side current value $i_{LOAD}(t)_{AVG}$. Thus, the secondary-side current controller 344 controls the average secondary-side current value $i_{LOAD}(t)$. Because the average secondary-side current $i_{LOAD}(t)_{AVG}$ is directly related to the primary-side current $i_P(t)$ at the known midpoint times of switch control signals $G_0$ and $G_1$, e.g. $t_{S0}$, $t_{S1}$, and $t_{S2}$, the secondary-side current controller 344 can set a value of the secondary-side current $i_{LOAD}(t)$ based on the exemplary primary-side signal value $V_P(t)\_{FB}$, which is directly proportional to the primary-side current $i_P(t)$, i.e. $V_P(t)\_{FB} \alpha\ i_P(t)$, where "$\alpha$" is a proportionality indicator. In at least one embodiment, $V_P(t)\_{FB} = i_P(t)/R_S$, where $R_S$ is the resistance value of sense resistor 350. In at least one embodiment, the secondary-side current controller 344 sets the average value $i_{LOAD}(t)$AVG of secondary-side current $i_{LOAD}(t)$ when the magnetizing current $i_M(t)$ is at a predetermined value, e.g. at $i_M(t)=0$.

The average value $i_{LOAD}(t)_{AVG}$ of secondary-side current $i_{LOAD}(t)$ can be determined in any number of other ways also. For example, in at least one embodiment, the average value of the primary-side current $i_P(t)$ during each pulse of switch control signals $G_0$ and $G_1$ or over a number of pulses also corresponds to the average value of the secondary-side current value $i_{LOAD}(t)_{AVG}$. For example, the primary-side current $i_P(t)$ is zero when switch control signals $G_0$ and $G_1$ cause switches 328 and 330 to turn OFF, e.g. for an n-channel FET embodiments of switches 328 and 330, the primary-side current $i_P(t)$ is zero when switch control signals $G_0$ and $G_1$ are low. Thus, an average value $i_P(t)\_{AVG}$ of the primary-side current $i_P(t)$ over a period of switch control signals $G_0$ and $G_1$ or when switch control signals $G_0$ and $G_1$ cause switches 328 and 330 to conduct also equals $i_{LOAD}(t)_{AVG}$ in accordance with Equation [8]:

$$i_P(t)\_{AVG} = i_{LOAD}(t)_{AVG} N_S / N_P \quad [8].$$

Thus, in at least one embodiment, secondary-side current controller 344 determines an average value of the secondary-side current value $i_{LOAD}(t)_{AVG}$ by determining the average value of the primary-side current $i_P(t)$ during each pulse of switch control signals $G_0$ and $G_1$ or over a number of pulses and multiplying the value by the turns ratio $N_S/N_P$.

In at least one embodiment, the average value of the primary-side current $i_P(t)$ during each period of switch control signals $G_0$ and $G_1$ or over a number of periods also corresponds to the average value of the secondary-side current value $i_{LOAD}(t)_{AVG}$. Thus, in at least one embodiment, secondary-side current controller 344 determines an average value of the secondary-side current value $i_{LOAD}(t)_{AVG}$ by determining the average value of the primary-side current $i_P(t)$ during each period of switch control signals $G_0$ and $G_1$ or over a number of periods M (such as two consecutive samples of primary-side current $i_P(t)$) and multiplying the value by the turns ratio $N_S/N_P$ divided by (D·M). M is a number that represents the number of periods and D represents the duty cycle of switch control signals $G_0$ and $G_1$. In at least one embodiment, averaging two consecutive samples of the primary-side current $i_P(t)$ cancels any offset in the magnetizing current $i_M(t)$.

Figure 6:
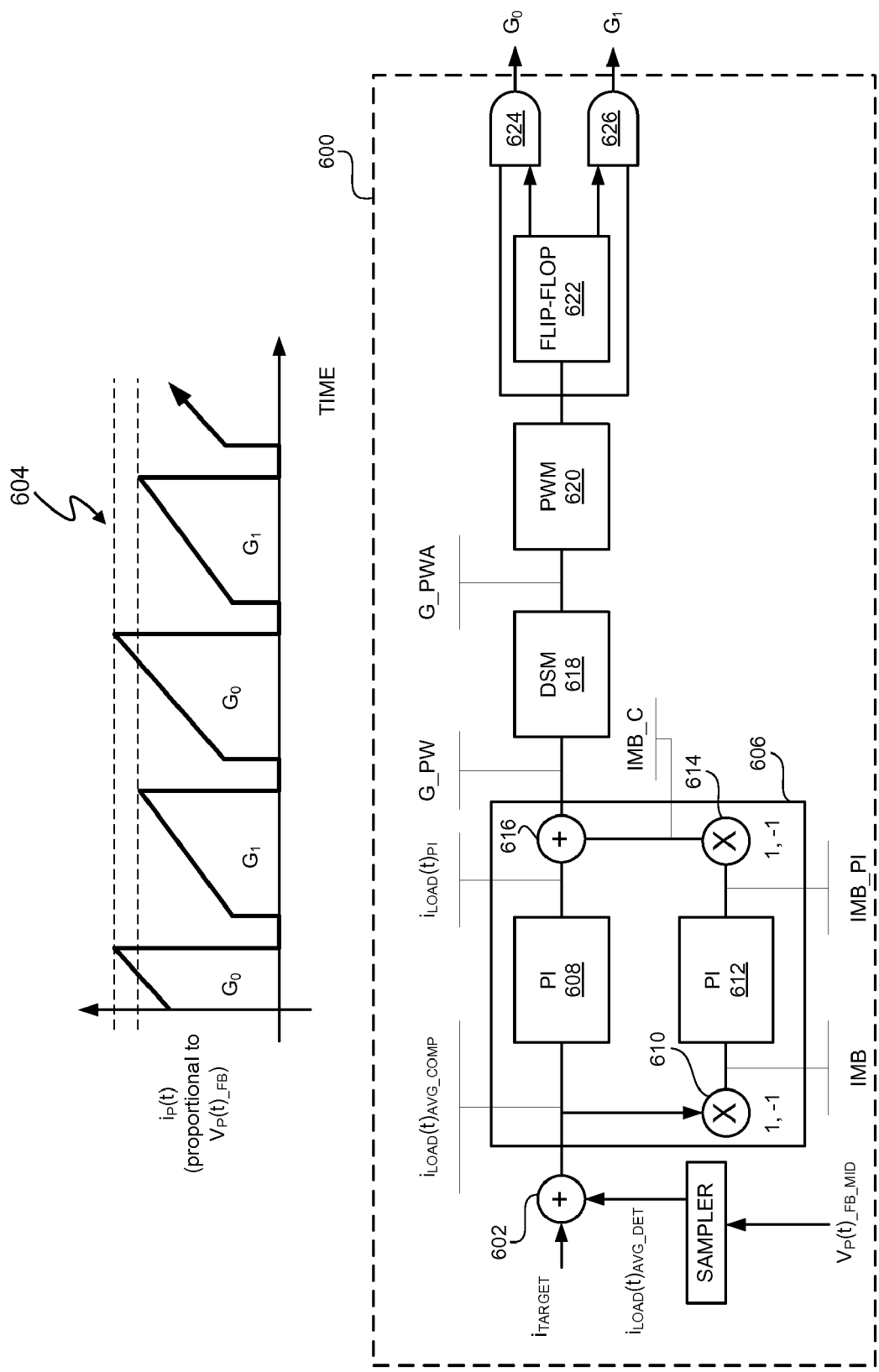
FIG. 6 depicts a secondary-side current controller.

FIG. 6 depicts secondary-side current controller 600 having components to generate the switch control signals $G_0$ and $G_1$ to set a secondary-side current average value $i_{LOAD}(t)_{AVG}$ and to compensate for imbalances in primary-side transformer interface 316. Secondary-side current controller 600 represents one embodiment of secondary-side controller 344 (FIG. 3). Summer 602 adds a target value $i_{TARGET}$ to a determined value $i_{LOAD}(t)_{AVG\_DET}$ of the actual secondary-side current value $i_{LOAD}(t)$ to generate a comparison signal $i_{LOAD}(t)_{AVG\_COMP}$. In at least one embodiment, the value of $i_{LOAD}(t)_{AVG\_DET} = N_S/N_P \cdot V_P(t)\_{FB}/R_S$. The target value $I_{TARGET}$ depends on the desired current draw by load 340. In at least one embodiment, the target value itarget represents a desired average load current value $i_{LOAD}(t)\_{AVG}$. In at least one embodiment, the desired current draw of load 340 is directly related to a desired brightness of the LEDs of load 340. The desired brightness can be a fixed amount or can be obtained from lighting data received from, for example, a dimmer or external brightness detector. Because of the relationships among signals of the primary-side 346 and secondary-side 348, such as the relationships depicted in Equations [1] through [6], the particular manner of generating the switch control signals $G_0$ and $G_1$ to set a value, e.g. $i_{LOAD}(t)_{AVG}$, of the secondary-side current based on the primary-side signal value, e.g. $V_P(t)\_{FB}$ is a matter of design choice.

The push-pull circuit 316 may have imbalances that would cause the primary-side current $i_P(t)$ to have a waveform that varies depending upon when switch 328 conducts and when switch 330 conducts. Imbalances in push-pull circuit 316 can cause the secondary voltage $V_S$ to fluctuate some relative to the depiction of secondary voltage $V_S$ in FIG. 4. Imbalances can be caused by, for example, mismatched characteristics of switches 328 and 330. In at least one embodiment, secondary-side current controller 344 compensates for the imbalances so that secondary voltage $V_S$ generally behaves as depicted in FIG. 4. The primary-side current $i_P(t)$ signal 604 depicts an exemplary imbalance caused by, for example, an on-time resistance of switch 330 being higher than an on-time resistance of switch 328. Push-pull circuit 316 includes a compensator 606 to compensate for imbalances in push-pull circuit 316 to, for example, prevent saturation of transformer 318. The compensator has two signal paths. The first signal path includes proportional-integrator (PI) 608. PI 608 generates an output signal $i_{LOAD}(t)\_{PI}$ that smoothly responds to changes in comparison signal $i_{LOAD}(t)_{AVG\_COMP}$ to guard against abrupt changes in comparison signal $i_{LOAD}(t)_{AVG\_COMP}$ and, thus, abrupt changes in the average value $i_{LOAD}(t)_{AVG}$ of secondary-side current $i_{LOAD}(t)$.

In at least one embodiment, the compensator 606 compensates for imbalances by decreasing the duty cycle of switch control signal $G_0$ (or, equivalently, increasing the duty cycle of switch control signal $G_1$) relative to the duty cycle of switch control signal $G_1$ if the feedback voltage $V_P(t)\_{FB}$ indicates that the primary-side current $i_P(t)$ has a higher value when switch 328 is ON than when switch 330 is ON. Likewise, in at least one embodiment, the compensator 606 compensates for imbalances by decreasing the duty cycle of switch control signal $G_1$ (or, equivalently, increasing the duty cycle of switch control signal $G_0$) relative to the duty cycle of switch control signal $G_0$ if the feedback voltage $V_P(t)\_{FB}$ indicates that the primary-side current $i_P(t)$ has a higher value when switch 330 is ON than when switch 328 is ON.

The second signal path includes a multiplier 610 that alternately multiplies the comparison signal $i_{LOAD}(t)_{AVG\_COMP}$ by alternating sequences of 1 and (−1) at the frequency of switch control signals $G_0$ and $G_1$. The imbalance output signal IMB of multiplier 610 represents a difference in the primary-side current $i_P(t)$ from respective pulses of switch control signals $G_0$ and $G_1$. PI 612 generates signal IMB_PI which smoothes abrupt changes in the imbalance output signal IMB. Multiplier 614 multiplies signal IMB_PL by 1 when generating switch control sign $G_0$ and by −1 when generating switch control signal $G_1$ to generate imbalance correction signal IMB_C. Adder 616 adds output signal $i_{LOAD}(t)\_{PI}$ and imbalance correction signal IMB_C to generate a desired pulse width signal G_PW of the switch control signals $G_0$ and $G_1$. Delta sigma modulator 618 processes the desired pulse width signal G_PW to shift noise in the pulse width signal G_PW out of a baseband of switch control signals $G_0$ and $G_1$. Pulse width modulator 620 converts the modulated output signal GPW_A into a pulse width modulated signal. Pulse width modulator 620 generates the modulated output signal GPW at twice the frequency of switch control signals $G_0$ and $G_1$. Flip-flop 622 is connected to AND gates 624 and 626 to alternately enable the outputs of AND gates 624 and 626. Thus, the modulated output signal GPW alternately becomes switch control signal $G_0$ and switch control signal $G_1$.

Referring to FIG. 3, in at least one embodiment, controller 304 can also utilize the primary-side signal value, e.g. voltage $V_P(t)\_{FB}$, to control link voltage $V_L$ alone or together with controlling switch control signals $G_0$ and $G_1$ in order to set a value of the secondary-side current $i_{LOAD}(t)$. Melanson I describes an exemplary process for regulating the link voltage $V_L$.

Figure 7:
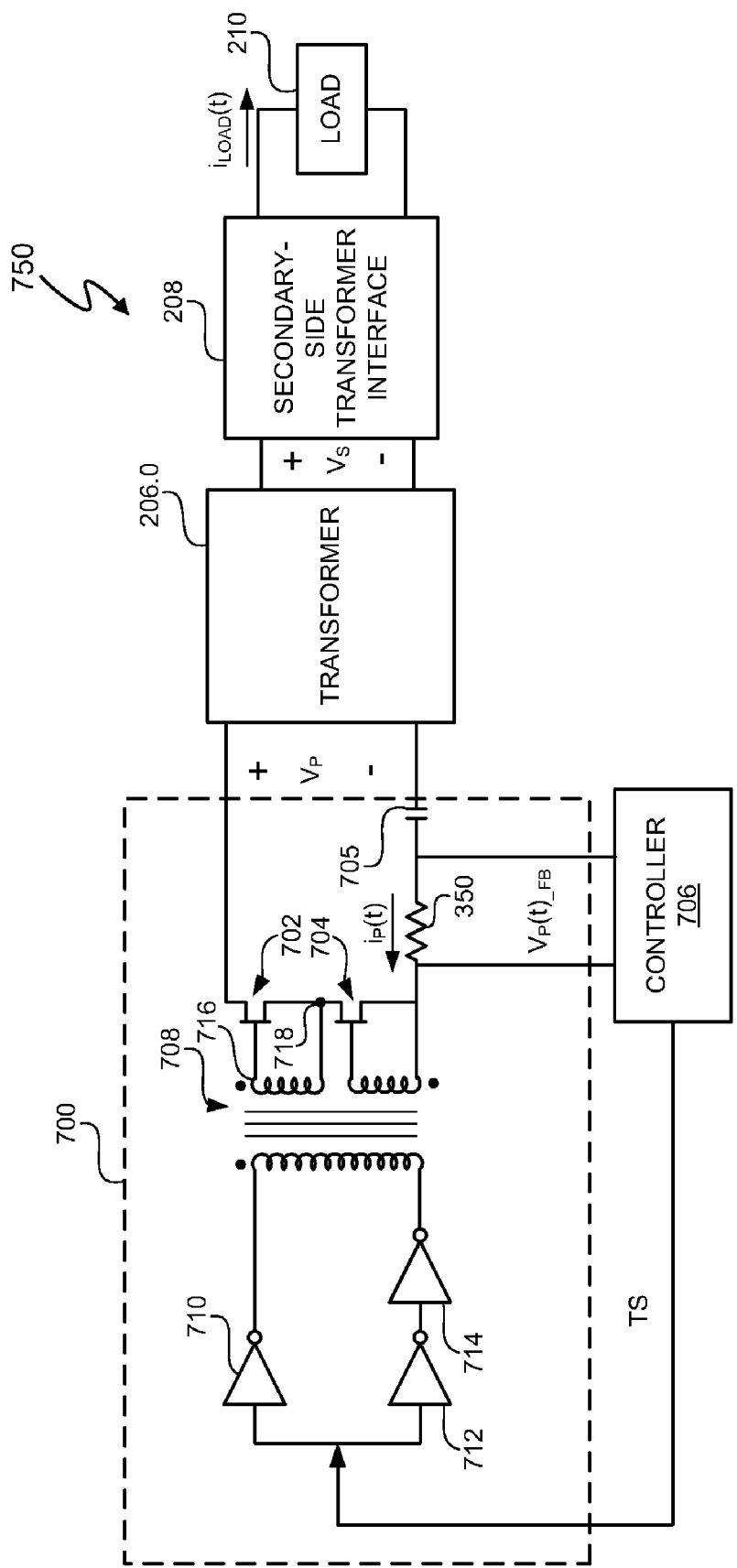
FIG. 7 depicts a power control system with an exemplary half-bridge primary-side transformer interface.

The particular type of primary-side transfer interface 204 is a matter of design choice. FIG. 7 depicts power control system 750 with a half-bridge primary-side transfer interface 700. Half-bridge primary-side transfer interface 700 represents one embodiment of the primary-side interface 204. N-channel FETs 702 and 704 operate as switches and are alternately turned ON and OFF with both transistors 702 and 704 being OFF immediately following each ON time. Capacitor 705 is sufficiently large to maintain an approximately constant capacitor voltage. The primary-side current $i_P(t)$ develops the voltage $V_P(t)\_{FB}$ across sense resistor 350, and controller 706 generates a pulse width modulated control signal TS. Control signal TS is applied to the input terminal of inverter 710 and to the input terminal of inverter 712. Inverter 712 is serially connected to inverter 714 so that the input to inverter 712 is the same as the output of inverter 714. Transformer 708 induces a voltage in a secondary-side 716 of transformer 708 when control signal TS is LOW sufficient to turn transistor 702 ON. Transformer 708 induces a voltage for a secondary-side 716 sufficient when control signal TS is HIGH and sufficient to turn transistor 704 ON. In at least one embodiment, transistors 702 and 704 are isolated from controller 706 to provide stability to voltage node 718. Controller 706 adjusts the pulse width and duty cycle of control signal TS to compensate for imbalance and to control the primary-side voltage $V_P$ and, thus, control the secondary-side current $i_{LOAD}(t)$ based on the primary-side signal value voltage $V_P(t)\_FB$.

Figure 8:
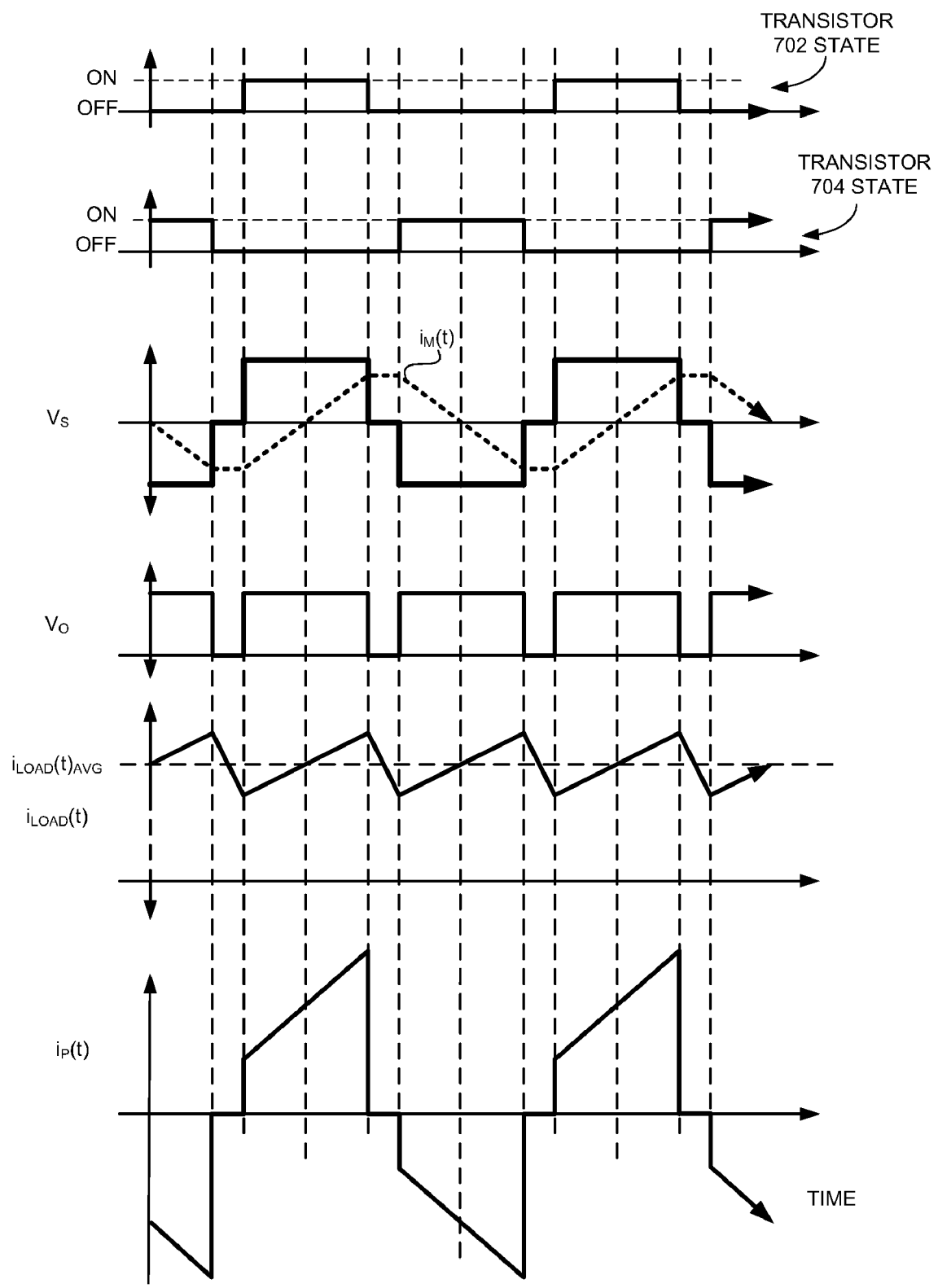
FIG. 8 depicts signal waveforms for the system of FIG. 7.

FIG. 8 depicts exemplary signals in power control system 750. The primary-side current $i_P(t)$ is inverted when transistor 704 is ON. Thus, Equation [6] is valid when transistor 702 is ON, and the primary-side current $i_P(t)$ is related to the secondary-side current average value $i_{LOAD}(t)_{AVG}$ in accordance with Equation [9]:

$$i_{LOAD}(t)_{AVG} \cdot N_S = -i_P(t) N_P \qquad [9].$$

In at least one embodiment, transformer 720 has one primary-side winding and one secondary-side winding. In at least one embodiment, an additional secondary winding (not shown) provides auxiliary power for controller 706.

Figure 9:
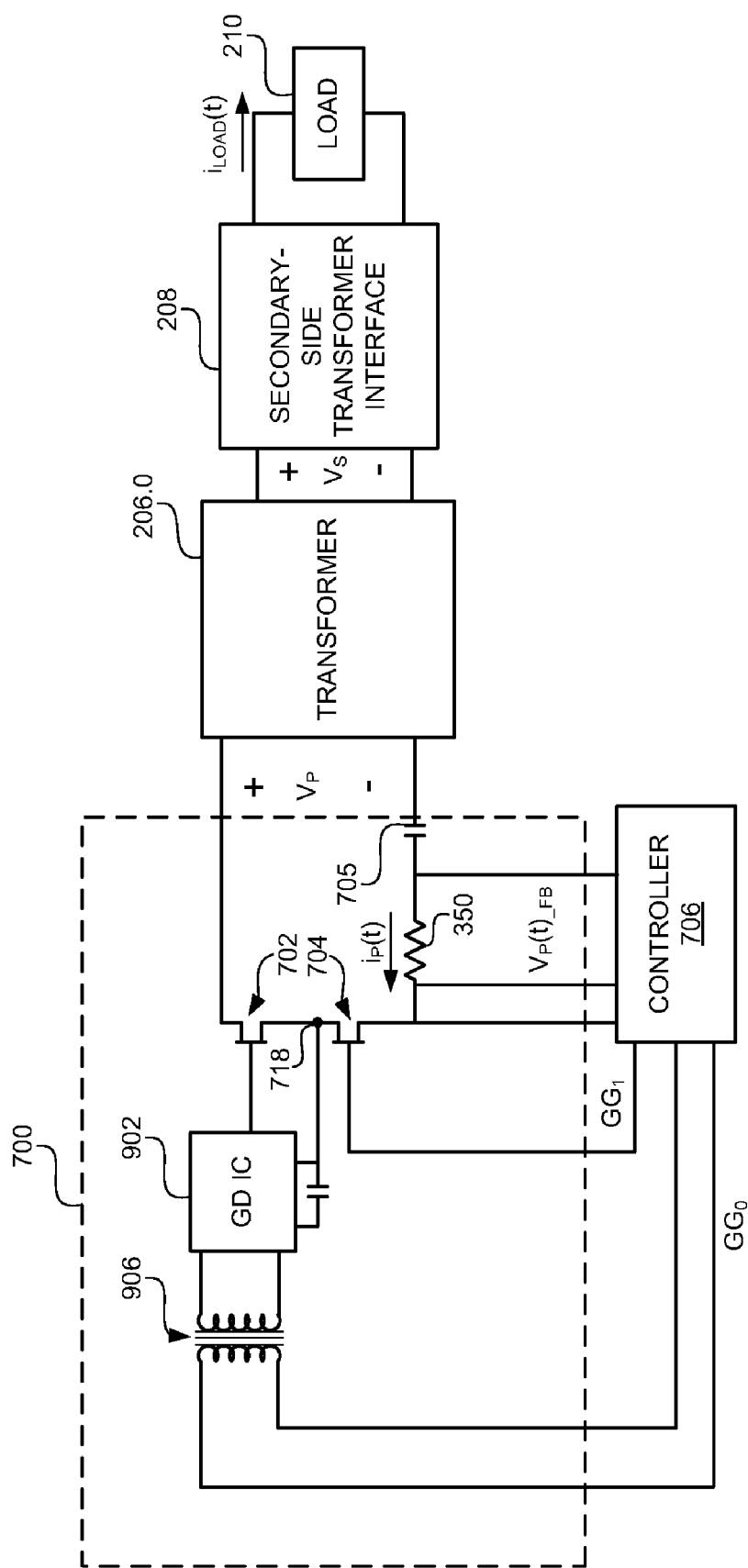
FIG. 9 depicts a power control system with an exemplary half-bridge primary-side transformer interface.

FIG. 9 depicts embodiment of a half-bridge primary-side interface 900, which represents an additional embodiment of primary-side interface 204. Half-bridge primary-side interface 900 operates the same as half-bridge primary-side transfer interfaces 700 except that interface 900 includes a gate drive integrated circuit (IC) 902 to drive transistor 702. The gate drive IC 902 is coupled to the controller 904 via a transformer 906, and transistor 704 is directly coupled to gate drive circuitry internal to controller 904. Half bridge driver part number IR2111 by Internal Rectifier of California, USA, represents one embodiment gate drive IC 902. Controller 904 operates in the same manner as controller 706 except that separate gate drive signals $GG_0$ and $GG_1$ are developed having the same waveform as the respective output signals of inverters 710 and 714 of power control system 750 shown in FIG. 7.

Although several, exemplary primary-side transformer interfaces have been described, the selection of a primary-side transformer interface is a matter of design choice. Regardless of the type of primary-side transformer interface, at least one secondary-side current value, such as the average value $i_{LOAD}(t)_{AVG}$ of a secondary-side current $i_{LOAD}(t)$, can be determined or implied from a primary-side signal value, such as voltage $V_P(t)\_FB$. In at least one embodiment, the average secondary-side current value $i_{LOAD}(t)_{AVG}$ can be implied by the relationship in Equation [6] when the magnetizing current is zero.

Figure 10:
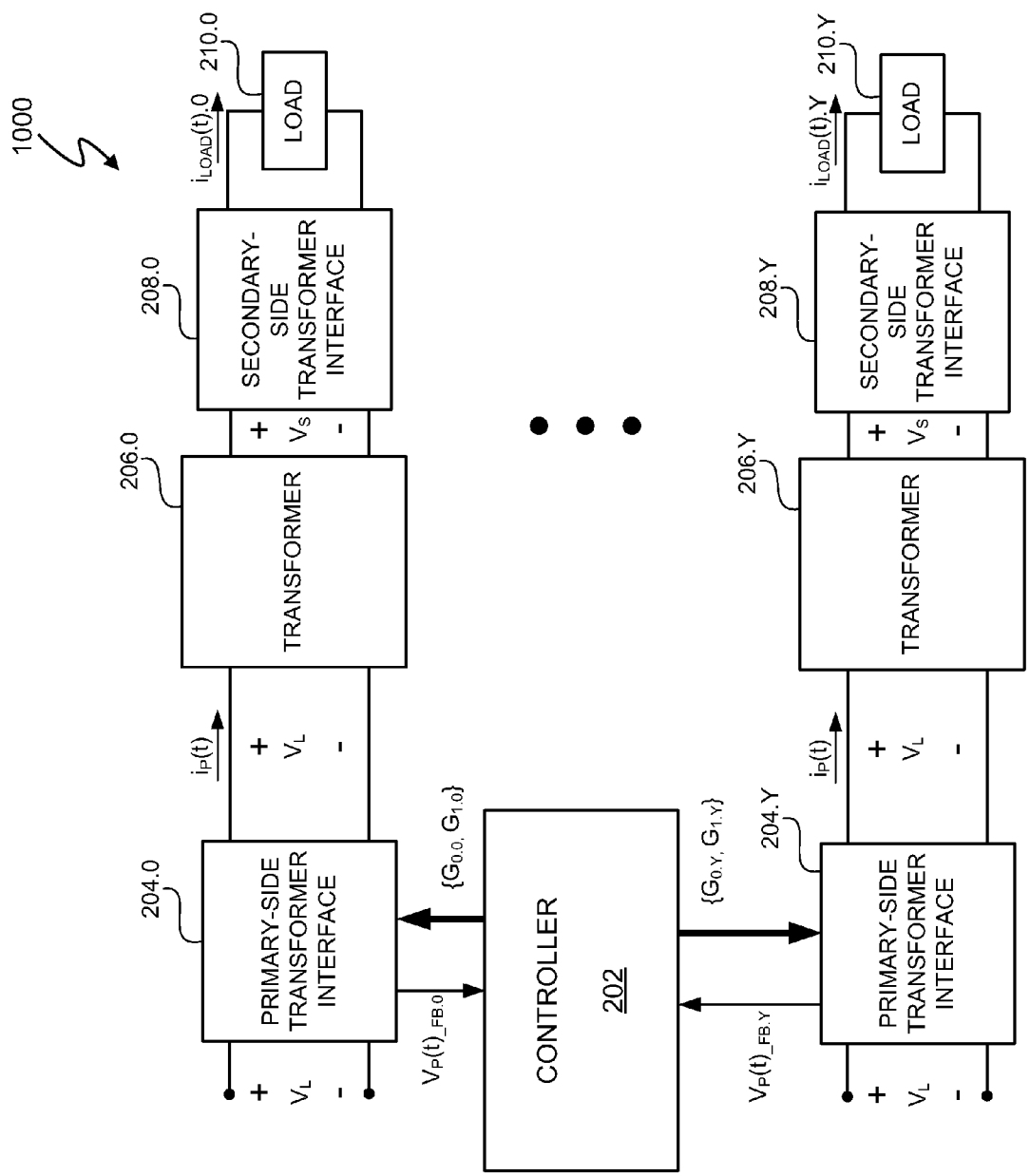
FIG. 10 depicts a power control system with multiple loads.

FIG. 10 depicts power control system 1000 having multiple loads 210.0-210.Y, where Y+1 represents the number of loads and Y is a positive integer. In at least one embodiment, controller 202 generates each set of switch control signals $\{G_{0.0}, G_{1.0}\} \ldots \{G_{0.Y}, G_{1.Y}\}$ in the same manner as the generation of switch state control signals $G_0$ and $G_1$ by controller 304 in FIG. 3. Thus, controller 202 can control multiple secondary-side output currents $i_{LOAD}(t).0 \ldots i_{LOAD}(t).Y$ based on respective primary-side signal values, such as voltages $V_P(t)\_FB.0 \ldots V_P(t)\_FB.Y$. Additionally, although a single link voltage $V_L$ is depicted, different link voltages could be supplied to primary-side transformer interfaces 204.0 . . . 204.Y.

Thus, in at least one embodiment, an electronic system includes a transformer. In at least one embodiment, a controller is configured to regulate a current on a secondary-side of the transformer based on a primary-side signal value. In at least one embodiment, the primary-side signal value is a sample of the primary-side transformer current and the secondary-side current is a current to a load, and, in at least one embodiment, the controller does not receive feedback from the secondary-side of the transformer. In at least one embodiment, the load includes one or more LEDs.

Although the present invention has been described in detail, it should be understood that various changes, substitutions and alterations can be made hereto without departing from the spirit and scope of the invention as defined by the appended claims.

What is claimed is:

1. An apparatus comprising:
a controller to regulate a load current to a load coupled to a secondary-side of a transformer to an approximately average value based on an observed primary-side signal value, wherein (i) the controller is configured to (a) generate one or more duty cycle modulated switch control signals to control a voltage on a primary-side of the transformer based on the primary-side signal value and (b) compensate for imbalances in a primary-side interface of the transformer and (ii) the load current represents a current into the load and out of a filter coupled to a rectifier coupled to the secondary-side of the transformer.

2. The apparatus of claim 1 wherein the load comprises a light emitting diode.

3. The apparatus of claim 1 wherein the primary-side signal value represents a current in the primary-side of the transformer.

4. The apparatus of claim 3 wherein the primary-side signal value is a voltage signal.

5. The apparatus of claim 1 wherein the controller is configured to generate the one or more switch control signals based on a value of the primary-side signal value occurring at a sampling time during a period of at least one of the switch control signals.

6. The apparatus of claim 5 wherein the primary-side signal value represents a current in the primary-side of the transformer and the sampling time is when an average value of the current in the primary-side is reached.

7. The apparatus of claim 5 wherein the primary-side signal value represents a current in the primary-side of the transformer and the sampling time corresponds to a midpoint during a pulse of at least one of the one or more switch control signals.

8. The apparatus of claim 5 wherein the sampling time occurs when a magnetizing current of the transformer is approximately zero.

9. The apparatus of claim 1 wherein the one or more switch control signals control a plurality of switches coupled to one or more windings of the primary side of the transformer, wherein the one or more windings and the switches are configured in a push-pull configuration and the controller is configured to generate a plurality of the one or more switch control signals to control conductivity of the switches.

10. The apparatus of claim 1 wherein the one or more switch control signals control a plurality of switches coupled to one or more windings of the primary side of the transformer, wherein the one or more windings and the switch are configured in a half-bridge configuration and the controller is configured to generate the one or more switch control signals to control conductivity of the switches.

11. The apparatus of claim 1 wherein the controller is configured to determine at least one of the one or more switch control signals independently of a value of an input voltage at the primary-side and independently of inductance values on the primary and secondary sides of the transformer.

12. The apparatus of claim 1 wherein the controller is further configured to control power factor correction of a switching power converter.

13. The apparatus of claim 1 wherein the controller is further configured to receive lighting data and the approximately average value of the current on the secondary-side of the isolation transformer is determined by the lighting data.

14. The apparatus of claim 13 wherein the lighting data is received from a dimmer.

15. The apparatus of claim 1 wherein the controller is further configured to generate multiple sets of one or more switch control signals to drive primary-sides of a plurality of transformers, wherein, for each of the transformers, the controller is configured to regulate an output current on a secondary-side of the transformer to an approximately average value based on a primary-side signal value, wherein the controller is configured to generate one or more switch control signals to control a voltage on a primary-side of the transformer based on the primary-side signal value.

16. A method comprising:
regulating a load current to a load coupled to a secondary-side of a transformer to an approximately average value based on an observed primary-side signal value, wherein regulating the output current comprises (i) generating one or more duty cycle modulated switch control signals to control a voltage on a primary-side of the transformer based on the primary-side signal value and (b) compensating for imbalances in a primary-side interface of the transformer and the load current represents a current into the load and out of a filter coupled to a rectifier coupled to the secondary-side of the transformer.

17. The method of claim 16 wherein the load comprises a light emitting diode.

18. The method of claim 16 wherein the primary-side signal value represents a current in the primary-side of the transformer.

19. The method of claim 18 primary-side signal value is a voltage signal.

20. The method of claim 16 further comprising:
sampling the primary-side signal value at a sampling time during a period of at least one of the switch control signals.

21. The method of claim 20 wherein the primary-side signal value represents a current in the primary-side of the transformer and the sampling time is when an average value of the current in the primary-side is reached.

22. The method of claim 20 wherein the primary-side signal value represents a current in the primary-side of the transformer and the sampling time corresponds to a midpoint during a pulse of at least one of the one or more switch control signals.

23. The method of claim 20 wherein the sampling time occurs when a magnetizing current of the transformer is approximately zero.

24. The method of claim 16 wherein the one or more switch control signals control a plurality of switches coupled to one or more windings of the primary side of the transformer, wherein the one or more windings and the switches are configured in a push-pull configuration and the method further comprises:
generating a plurality of the one or more switch control signals to control conductivity of the switches.

25. The method of claim 16 wherein the one or more switch control signals control a plurality of switches coupled to one or more windings of the primary side of the transformer, wherein the one or more windings and the switch are configured in a half-bridge configuration and the method further comprises:
generating the one or more switch control signals to control conductivity of the switches.

26. The method of claim 16 further comprising:
determining at least one of the one or more switch control signals independently of a value of an input voltage at the primary-side and independently of inductance values on the primary and secondary sides of the transformer.

27. The method of claim 16 further comprising:
controlling power factor correction of a switching power converter.

28. The method of claim 16 further comprising:
receiving lighting data; and
determining the approximately average value of the current on the secondary-side of the isolation transformer using the lighting data.

29. The apparatus of claim 28 wherein the lighting data is received from a dimmer.

30. The method of claim 16 further comprising:
generating multiple sets of one or more switch control signals to drive primary-sides of a plurality of transformers; and
for each of the transformers, regulating an output current on a secondary-side of the transformer to an approximately average value based on a primary-side signal value, wherein regulating the output current comprises generating one or more switch control signals to control a voltage on a primary-side of the transformer based on the primary-side signal value.

31. An electronic system comprising:
a controller, wherein the controller is configured to:
receive a feedback signal from a primary-side of a transformer, wherein the feedback signal represents a current in the primary-side of the transformer;
generate control signals for circuitry coupled to the primary-side of the transformer to regulate a load current on a secondary-side of the transformer to an approximately average value based on the feedback signal from the primary-side of the transformer without using a feedback signal from a secondary-side of the transformer and
compensate for imbalances in a primary-side interface of the transformer.

32. The electronic system of claim 31 wherein the controller is further configured to:
process the feedback signal to eliminate influence of a magnetizing current of the transformer.

33. The electronic system of claim 31 wherein the controller is configured to generate the one or more switch control signals based on a value of the primary-side signal value occurring at a sampling time during a period of at least one of the switch control signals.

34. The electronic system of claim 33 wherein the primary-side signal value represents a current in the primary-side of the transformer and the sampling time is when an average value of the current in the primary-side is reached.

35. The electronic system of claim 33 wherein the primary-side signal value represents a current in the primary-side of the transformer and the sampling time corresponds to a midpoint during a pulse of at least one of the one or more control signals.

36. The apparatus of claim 1 wherein the controller is further configured to generate switch control signals to control a push-pull circuit of the primary-side interface of the transformer.

37. The apparatus of claim 36 wherein the controller is configured to compensate for imbalances in a primary-side interface of the transformer by decreasing or increasing a duty cycle of a first of the switch control signals relative to a duty cycle of a second of the switch control signals.

38. The method of claim 16 the method further comprising:
generating switch control signals to control a push-pull circuit of the primary-side interface of the transformer.

39. The apparatus of claim 38 wherein generating the switch control signals further comprises:
decreasing or increasing a duty cycle of a first of the switch control signals relative to a duty cycle of a second of the switch control signals.

40. The electronic system of claim 31 wherein the controller is further configured to generate switch control signals to control a push-pull circuit of the primary-side interface of the transformer.

41. The apparatus of claim 40 wherein the controller is configured to compensate for imbalances in a primary-side interface of the transformer by decreasing or increasing a duty cycle of a first of the switch control signals relative to a duty cycle of a second of the switch control signals.

* * * * *